May 31, 1927.

A. B. FOWLER

HEEL MACHINE

Filed Dec. 4, 1918

A. B. FOWLER 1,630,561

HEEL MACHINE

Filed Dec. 4, 1918

INVENTOR

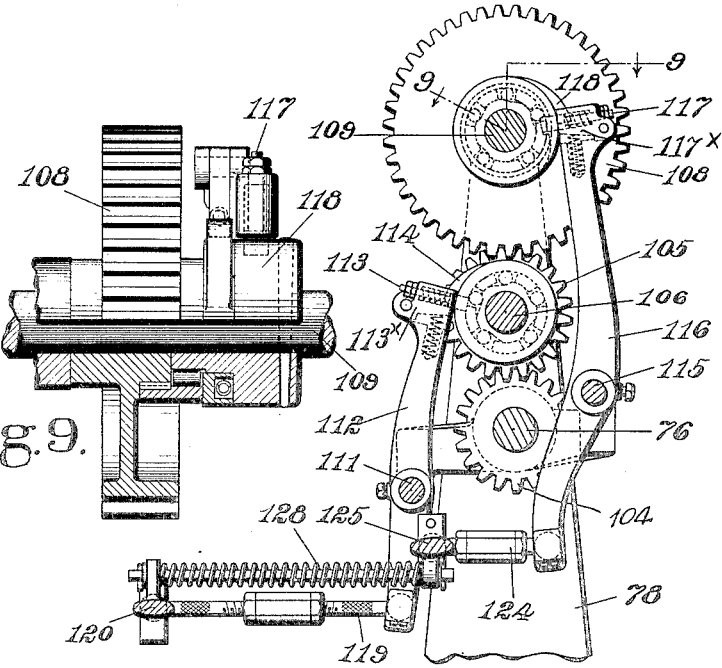
Fig. 9.
Fig. 8.
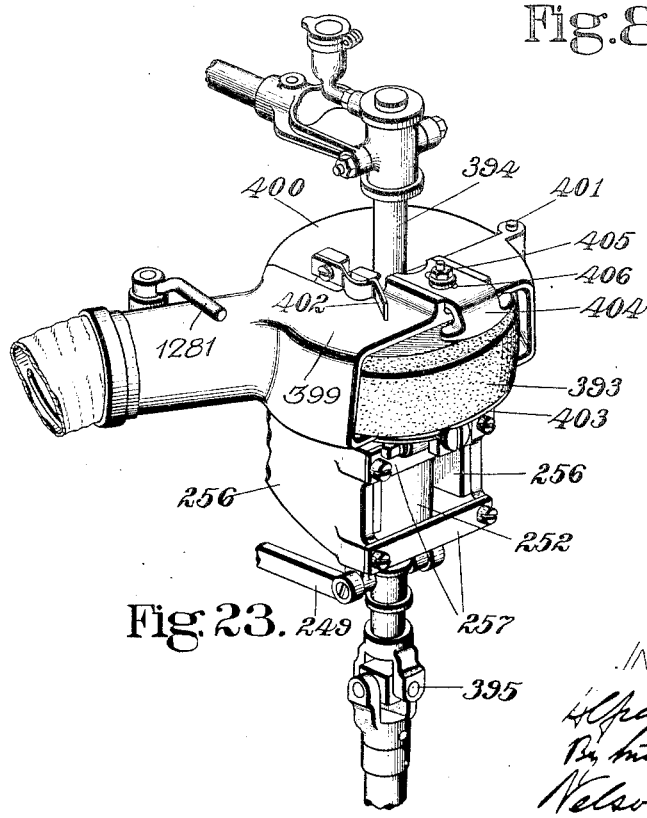
Fig. 23.

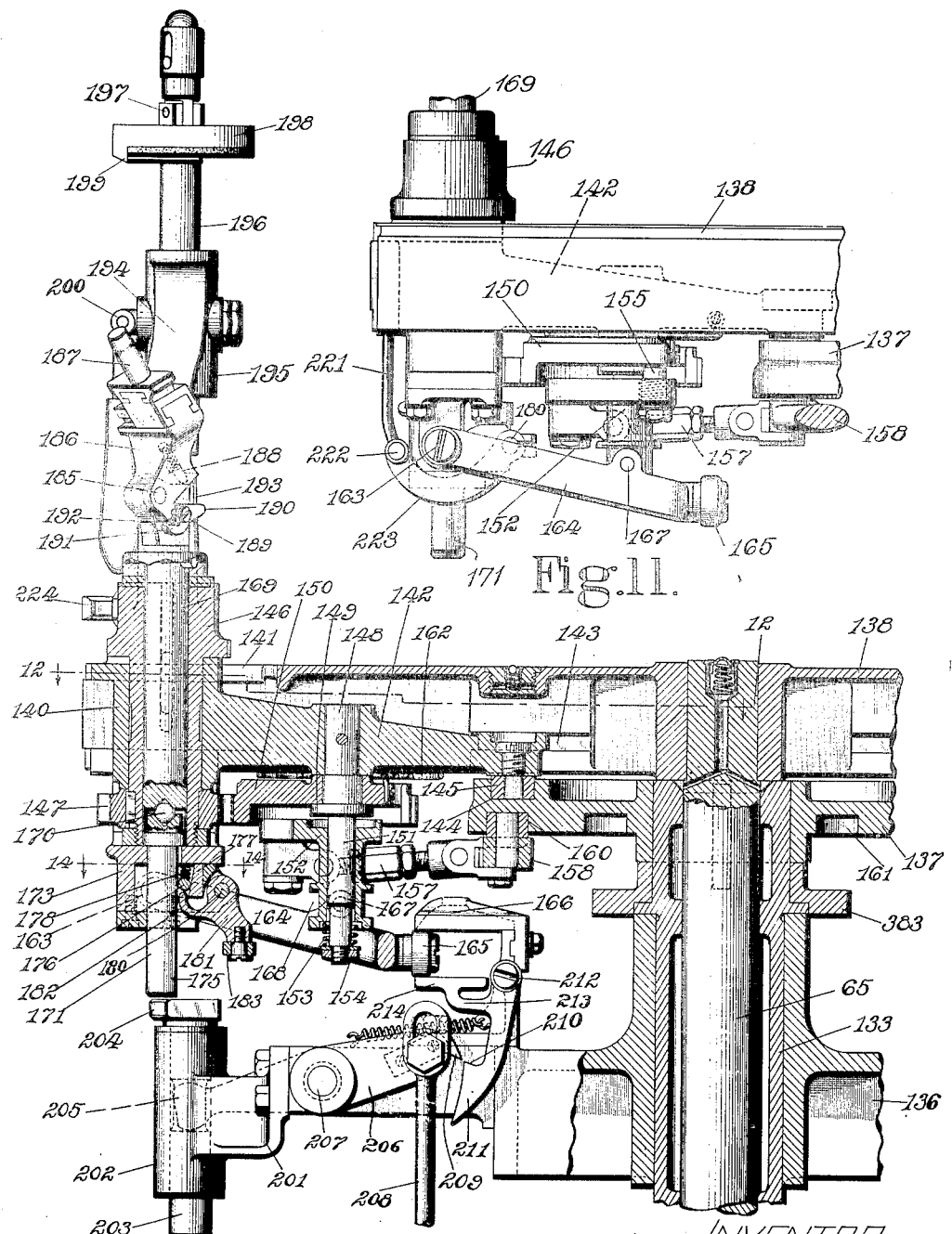

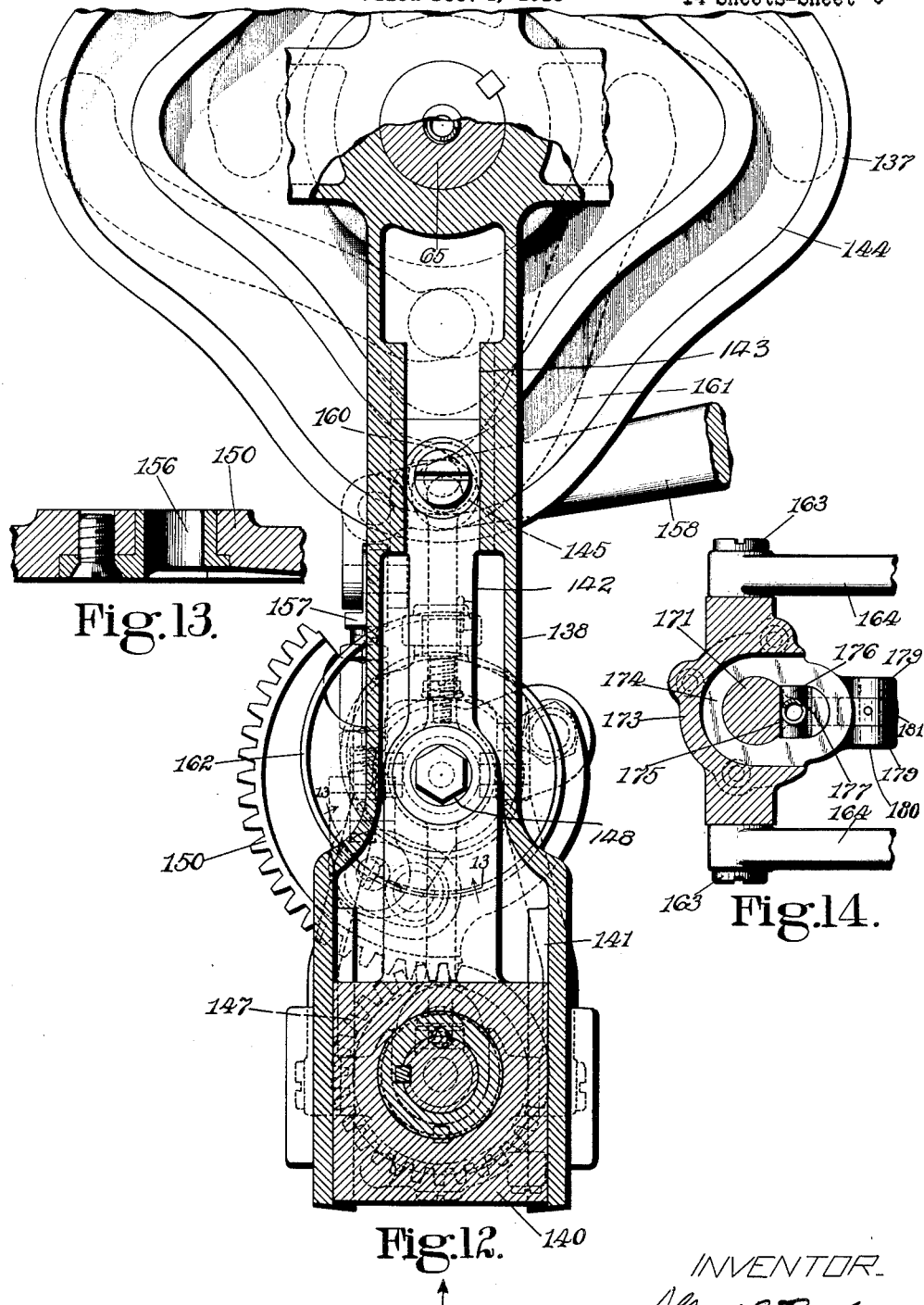

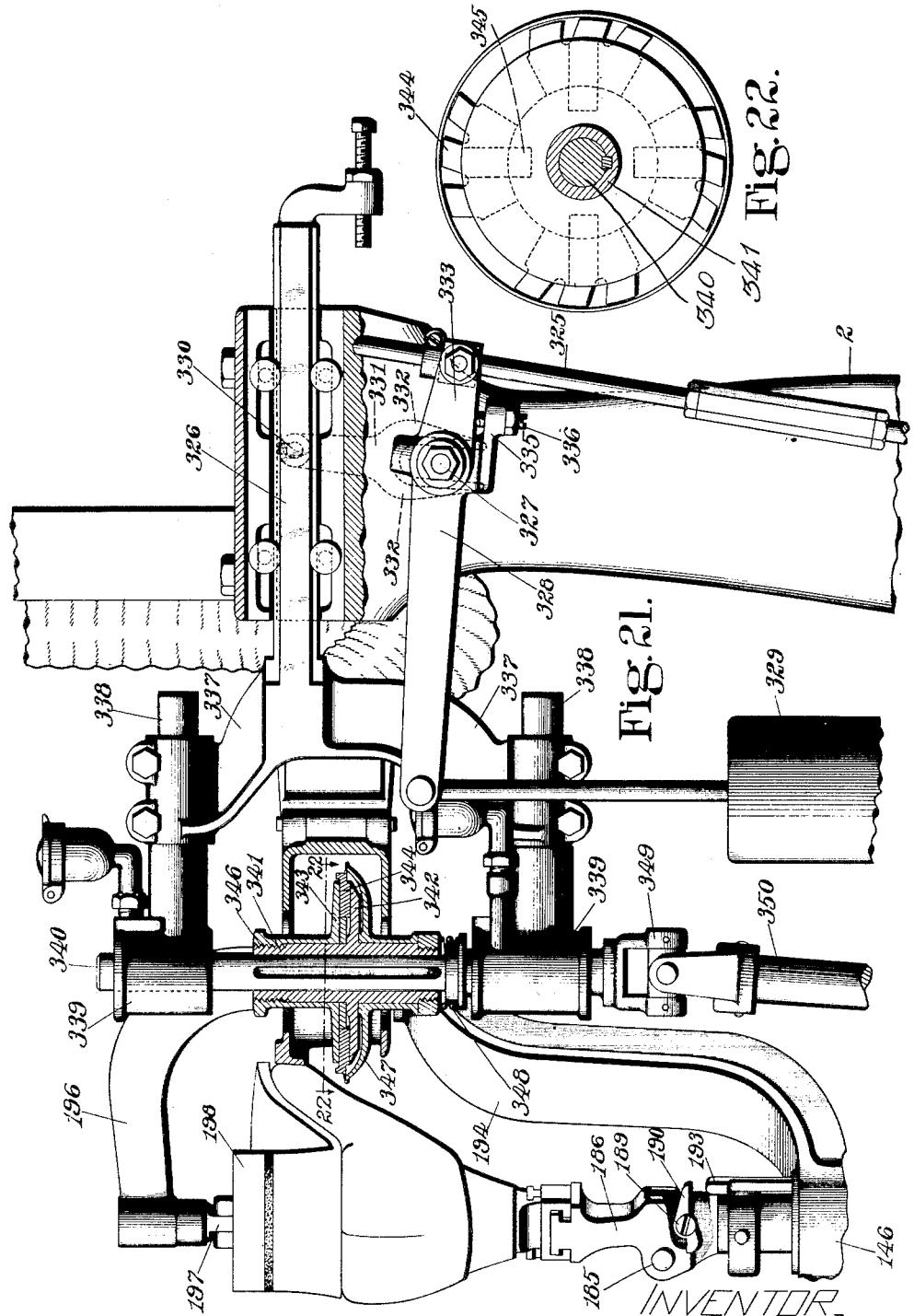

May 31, 1927.

A. B. FOWLER 1,630,561

HEEL MACHINE

Filed Dec. 4, 1918

INVENTOR

Patented May 31, 1927.

1,630,561

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

HEEL MACHINE.

Application filed December 4, 1918. Serial No. 265,245.

The invention to be hereinafter described relates to machines for manufacturing shoes, and is illustrated as embodied in a machine for treating or finishing the heels of shoes. The illustrated embodiment of the invention is a turret type machine in which a plurality of evenly spaced work-supports are provided so that intermittent movement of the turret is effective to carry the work supports successively into operative relation to a plurality of treating tools and to permit removal of a treated shoe and its replacement by another shoe. At each treating station the work supports are rotated to present various parts of the work to the tools. The novel features of the illustrated work support are not claimed herein but are claimed in a divisional application, Serial No. 82,710, filed January 21, 1926.

The heels of shoes are usually non-circular in horizontal cross-section, and the contour surface thereof, that is the surface between the edges of the tread and heel seat and extending along the sides and rear of, the heel between its breast corners, varies in extent and inclination according to the style or character of the heels. To secure a proper and uniform finish to the contour surface throughout, it is important that all portions thereof be subjected to the same treatment and that such treatment be uniform in duration and extent. Should the trimming or scouring tools, for instance, act for a longer period of time on one portion of the contour surface than another owing to the non-circular form of the heel in horizontal cross-section, or be not maintained in proper inclination corresponding to the desired incline of such surface from the edge of the heel seat to the edge of the tread, the contour surface will present undesirable irregularities in finish and non-uniformity in character. An important feature of the present invention, therefore, consists in relatively moving the heel and an operating tool to cause the latter to treat the same extent of contour surface of the heel of a shoe in successive units of time throughout the contour of the heel from one breast corner to the other. This feature of the invention insures uniformity of the contour surface throughout and may be carried into practical effect by various means, but in the illustrated embodiment of the invention the jacked shoe when operatively positioned for treatment of the heel by a tool, is given a turning and a bodily movement relative to the tool by cam means arranged to insure treatment of the same extent of surface in each unit of time.

Along with the variations of curvature of the outer peripheral surface of a heel, there are variations in pitch or inclination of said surface with respect to the tread surface of the toplift. Near the breast of the heel, for example, there may be little or no pitch, the surface being substantially at right angles to the tread surface, while along the sides the pitch may gradually increase to a maximum at the back of the heel. Accordingly, broadfaced tools of machines for automatically treating relatively wide bands around the peripheral surfaces of heels have been mounted for tilting movement and arranged resiliently to bear against the surfaces of the heels as the pitch varies from one part to another. With the arrangements heretofore provided this tilting action has taken place about an axis or axes intersecting the axis of a tool spindle, but in accordance with a feature of this invention, to facilitate obtaining even contact of the given tool with the work and uniform results around the whole surface of the heel, the tilting movement of the tool is constrained to take place about a center outside of the axis of the tool. In the illustrated embodiment of this feature of the invention the tool spindles of a plurality of tools of the type referred to are tiltably supported by parallel links and their inclinations are determined by means of rand crease guides and guides adapted to engage toplift plates or followers. Each of these tools is mounted so that it must tilt about an axis outside of the axis of the tool and in a predetermined horizontal plane which is fixed by the construction of the mounting. This axis is tangent to the rand crease guide and the tilting is therefore about a center coinciding with the point of engagement between the rand crease guide and the work.

As a result of the continually changing tilting action of each of these tools in its cycle around the heel, there is a variation in the pressure of the tool against the work. To insure against undesirable variations of the effect of the tool upon the work and danger of disengagement of the rand guide from the rand crease because of the possibility that the tilting force applied to the tool might cause it to tilt about the toplift guide as a fulcrum, still another feature of the invention consists in mechanism for controlling the variable action of a tool during the operation of the machine. According to one aspect of the invention means are provided for automatically varying the tilting force applied to the tool in a predetermined cycle as it is brought into contact with various portions of the heel. Another aspect of this feature of the invention relates to manually operated means for controlling the action of a tool of the kind referred to during the operation of the machine.

In another aspect, as herein illustrated, the invention provides novel means to insure against premature movement of the work carrier to take a piece of work away from the operator, thereby contributing to safe operation of the machine. Considered in this aspect and in accordance with a feature of the invention, the means which controls the rotation of the turret of the illustrated machine comprises a movable member which is also operative to effect shoe-jacking operations, but which must have its shoe-jacking movement reversed before the initiation of turret rotation. Thus it is only upon release of this member after the shoe is jacked that the turret begins to rotate. From another point of view, the invention thus provides a turret shoe-treating machine in which the action of power-operating means for the turret is suspended when one of the shoe supports is in jacking position until the jacking means has been operated and released. Preferably this releasing movement is made effective to start the operation of the power-operated means and to move the jacked shoe from jacking position to a tool for treatment. As a further safeguard a stop is provided to prevent operation of the jacking means or the starting treadle until a shoe support is presented thereto.

It is clearly undesirable to rotate that one of the work supports which is in the jacking position because of the resultant interference with the work of the operator in removing and replacing work upon the jack. The present invention provides, therefore, for the release of the work support which is at jacking position from the positive rotating mechanism and provides resilient means for moving it in the other direction to return each work support to a uniform position when it arrives at jacking position. Further to facilitate the use of the machine, it is desirable not only that the work support at jacking position shall be released from its rotating means and returned to uniform position but also that the completed work shall be released from the clamping mechanism so that it may be removed quickly by the operator. In accordance with still another feature of the invention, means are provided for automatically unjacking the shoe as the jack approaches jacking position together with means for tilting the shoe for convenient removal from the shoe support as it is unjacked.

It may be desirable at times to interrupt the operation of the machine momentarily during the continued actuation of the tool or tools, or to stop the table movement as it transports a jacked shoe towards a tool for treatment. An important feature of the invention consists of means under control of the attendant for effecting either of these results at will, and in case the operation of the machine is to be suspended with shoes in position for treatment, to simultaneously stop the jack turning means and remove the tool or tools from operative position. This feature of the invention is conveniently practiced by means of an emergency lever in convenient reach of the attendant for throwing off the power from the jack turning means, the table turning means, and retreating the tool or tools without however stopping the tool or tools.

The above and other novel features of the invention and new combinations of parts will be hereinafter described in connection with a machine for trimming, randing, and scouring the heels of shoes, but obviously the character of the tools may be varied within the true scope of the several features of the invention which will be defined in the claims.

In the drawings:

Fig. 8 is a section on the line 8—8 of Fig. 5;

Fig. 9 is a section on the line 9—9 of Fig. 8;

Fig. 10 is a section on the line 10—10 of Fig. 3, the parts being shown on a larger scale;

Fig. 11 is a detailed side elevation showing certain portions of the jack controlling devices;

Fig. 12 is an enlarged horizontal section on the line 12—12 of Fig. 10;

Fig. 13 is an enlarged sectional detail on the curved line 13—13 of Fig. 12;

Fig. 14 is a section on the line 14—14 of Figs. 10 and 15;

Fig. 21 is an enlarged side elevation, parts being shown in section, of the randing mechanism and its controlling means;

Fig. 22 is an enlarged detail sectional view on the line 22—22 of Fig. 21;

Fig. 23 is a detached detail perspective view showing the scouring mechanism, some of the parts being omitted for clearness of illustration;

The present invention contemplates a table or carrier for a series of shoe supports comprising shoe-supporting and shoe bottom pressing devices on which shoes may be jacked for successive treatment by a series of tools mounted independently of and about the table. The tools may be varied to suit the conditions of work intended to be performed upon the heels of boots and shoes presented to them by the shoe supports, but in the present instance of the invention the tools are shown as consisting of a trimming tool for trimming the contour surface of the heel from one breast corner to the other, a randing tool for finishing the rand of the shoe, and a scouring tool for scouring or smoothing the contour surface after treatment by the trimming tool, and while the invention is peculiarly advantageous in connection with tools of the described character, it is to be understood that it may also be advantageously employed in connection with other forms or kinds of tools. The tools, regardless of their particular character, are preferably rotated or operated continuously and means are provided for periodically moving the table or carrier to present the heels of jacked shoes successively to the operating tools, and then to automatically suspend the table movement and to actuate the jacked shoes while in operative relation with the tools for effecting in a unit of time treatment of the same extent of contour surface of the heels. When the respective shoes have been treated by the tools, the table or carrier is automatically moved to advance the shoes to the next tools of the series and to present a finished shoe to a jacking station where it is to be removed and another substituted for it.

These various features and the novel combinations of parts for effecting the purposes stated, will be made clear from the following description in connection with the embodiment of the invention shown in the accompanying drawings.

Figure 2:
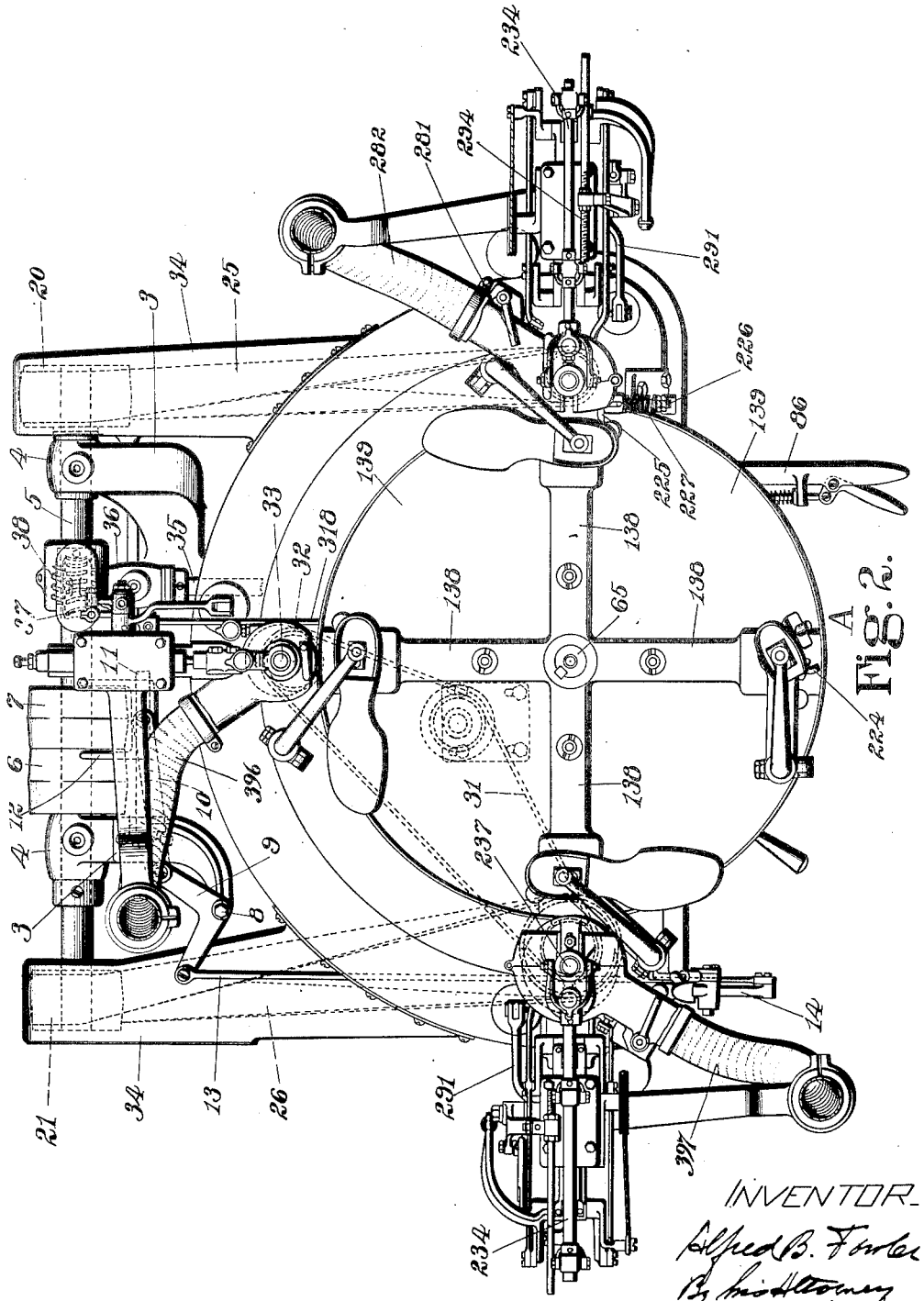
Fig. 2 is a plan view of the parts shown by Fig. 1, the air conduits being in part omitted.

The machine frame may be of suitable character to properly support the operating parts and as shown comprises a base 1 from which rise the tool supporting standards 2 and the rearwardly extending arms 3, Fig. 2, carrying bearings 4 for a driving shaft 5, Fig. 2, on which is mounted a fast and loose pulley 6, 7, adapted to be operated by a belt connection with a suitable source of power. Pivotally mounted at 8 on the arm 3 is a bell crank lever 9, Fig. 2, one end of which is connected by a link 10 to a slide 11 carrying the belt embracing forks 12. The other arm of the bell crank lever 9 is connected by a rod 13, Fig. 2, to a belt shipper handle 14, Figs. 2 and 3, pivotally mounted at 15 to a part of the machine frame and having a locking member 16 adapted to engage suitable notches in a locking segment 17 secured to a bracket 18 mounted on the machine frame. The locking member 16 is connected to a pivoted hand piece 19 the construction being such that upon manual manipulation of the shipper handle 14 the belt may be moved from the fast to the loose or from the loose to the fast pulley and the shipper handle locked in desired position.

Figure 3:
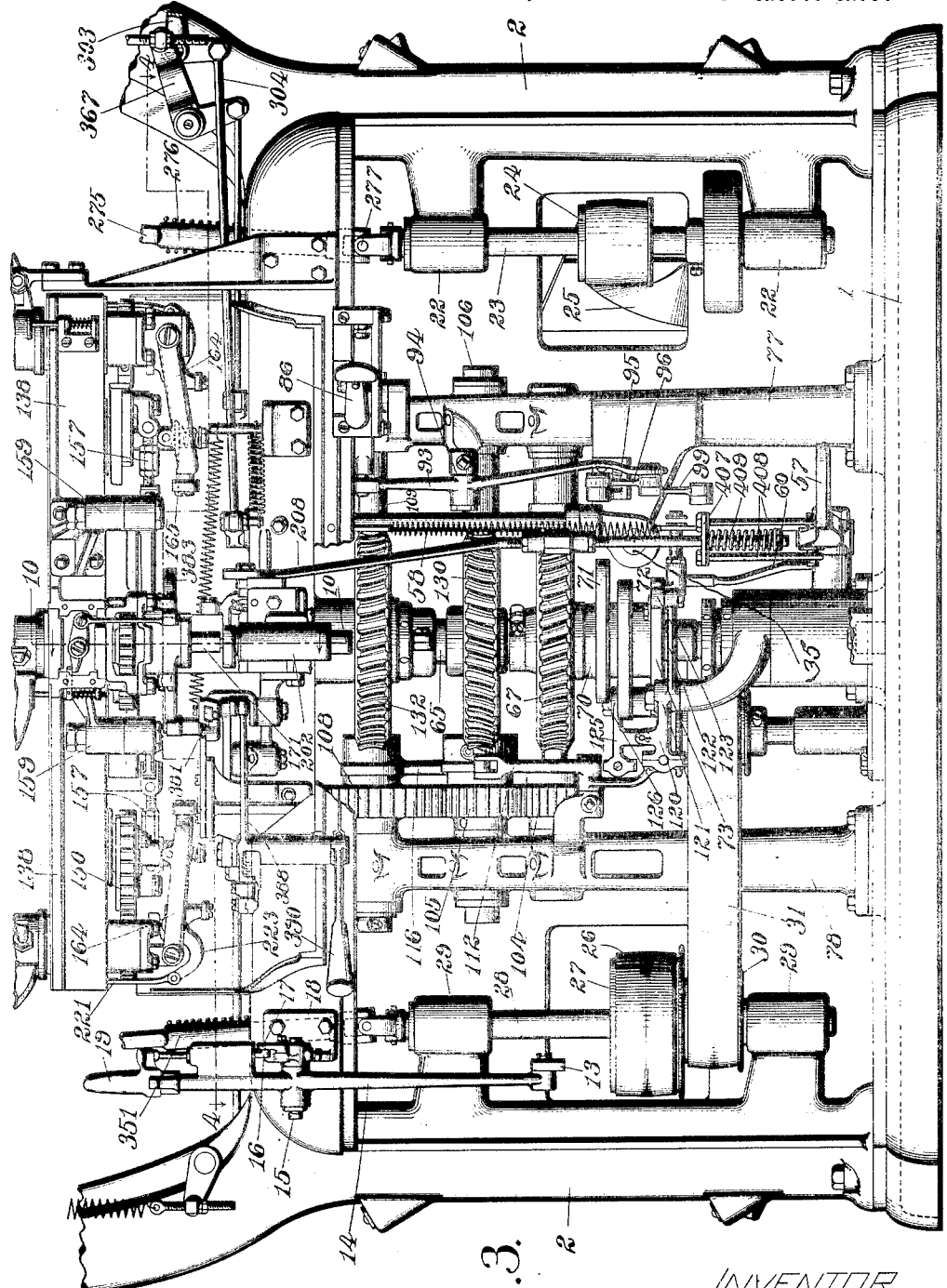
Fig. 3 is an enlarged front elevation of the lower part of the machine with the cover plates removed.

Secured to the drive shaft 5 are the belt pulleys 20 and 21 Fig. 2, from which the tool shafts are operated when the driving shaft 5 is driven as hereinbefore explained. Mounted in suitable bearings 22 extending from one of the risers or tool supporting standards 2 is a tool driving shaft 23, Fig. 3, having a pulley 24 driven by a belt 25, Figs. 2 and 3, from the pulley 20 on the drive shaft 5. Likewise the pulley 21 on the drive shaft is connected by a belt 26, Figs. 2 and 3, to a pulley 27 on a tool shaft 28 supported rotatably in bearings 29 extended from one of the tool supporting standards 2, as indicated in Fig. 3. The shaft 28 carries a pulley 30 about which passes a belt 31 connected to a pulley 32 on a tool shaft 33, Fig. 2, mounted between and to the rear of the tool shafts 23 and 28 heretofore described, the construction being such that so long as the drive shaft 5 is driven the tool shafts 23, 28 and 33 will be continuously driven to operate their respective tools as will more fully hereinafter appear. If desired, guard plates 34, Fig. 2, may be secured to the machine frame and extend over the belts 25 and 26.

The motion of the drive shaft 5 is imparted to the mechanism for controlling the table or carrier and the jacks or work supports through a shaft 35, Fig. 2, mounted in appropriate bearings 36 and having mounted thereon a worm wheel 37 in operative engagement with a worm 38 on the drive shaft 5 substantially as indicated in Fig. 2, the construction being such that so long as the drive shaft 5 is actuated the motion transmission shaft 35 will also be actuated.

Figure 7:
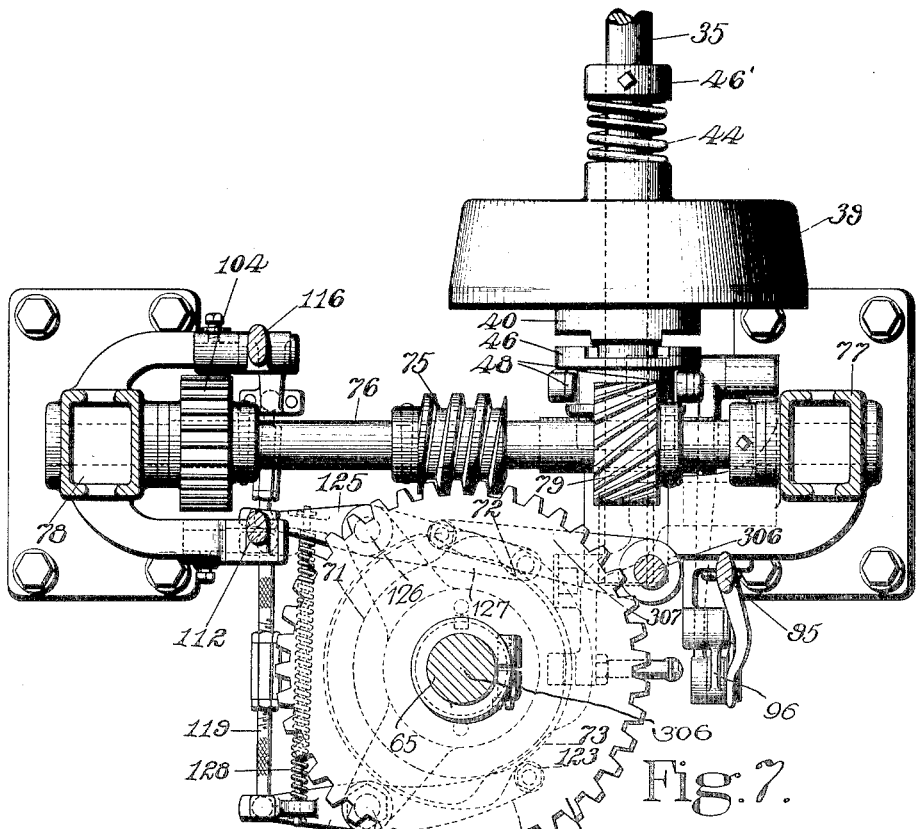
Fig. 7 is a section on the line 7—7 of Fig. 5, the parts being drawn on an enlarged scale.
Figure 6:
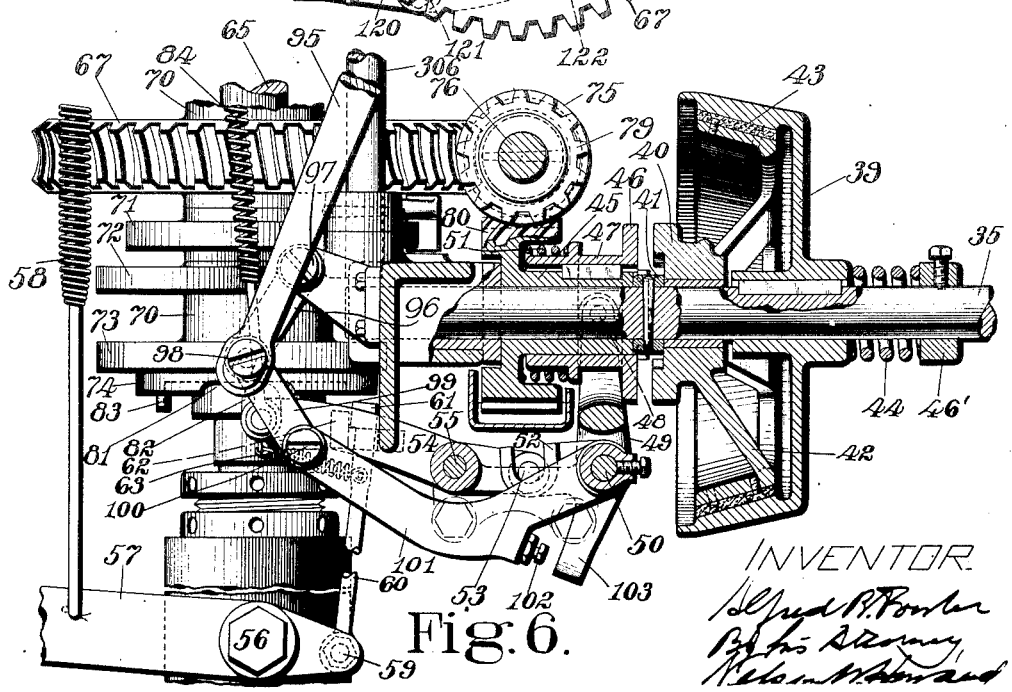
Fig. 6 is a section on the line 6—6 of Fig. 5, the parts being drawn on an enlarged scale to more clearly disclose the construction and relation thereof.

The shaft 35, see Figs. 6 and 7, has splined thereto one member 39 of a clutch, the other member 40 of which is loosely mounted on the shaft. Secured to the shaft 35, Fig. 6, is a collar 41 against which the hub portion of the loose member 40 of the clutch bears. Extending from the loose member 40 of the clutch are the arms 42 carrying suitable friction material 43, and a spring 44 on the shaft 35 is interposed between a collar 46′ secured to the shaft and the hub of the clutch member 39, the construction being such that the two clutch members will, under the stress of the spring 44, be normally held in operative relation and will, perforce, rotate together, but should any unusual obstruction occur to retard the member 40 of the clutch the two clutch members may yield or slip.

Loosely mounted on the shaft 35, Figs. 6 and 7, is a sleeve 45 on which is splined a clutch member 46 having a circular recess 47 engaged by pins or rolls 48 on the bifurcated end portions of an arm 49 pivoted at 50. The clutch member 46 is normally under the influence of a spring 51 tending to move the clutch member 46 into clutching engagement with the clutch member 40, said clutch members having complemental projecting and recessed portions for positive engagement, as indicated in Fig. 7.

The clutch controlling arm 49 has a recessed extension 52 which is engaged by a pin 53 mounted on the lever 54 pivoted at 55, the construction being such that should the lever 54 be turned clockwise, Fig. 6, the clutch member 46 will be moved to the left, Fig. 6, and be disengaged from the clutch member 40, but should the lever 54 be moved contraclockwise, Fig. 6, the pin 53 will rise and permit the spring 51 to engage the clutch members 46 and 40. The clutch member 46, as heretofore explained, is splined to the sleeve 45 and when the clutch members are operatively engaged the sleeve 45 will be turned. Trains of mechanism, are connected to the sleeve 45 and control the movements of the several parts of the machine including the work supports and controlling cams as will more fully appear.

Figure 5:
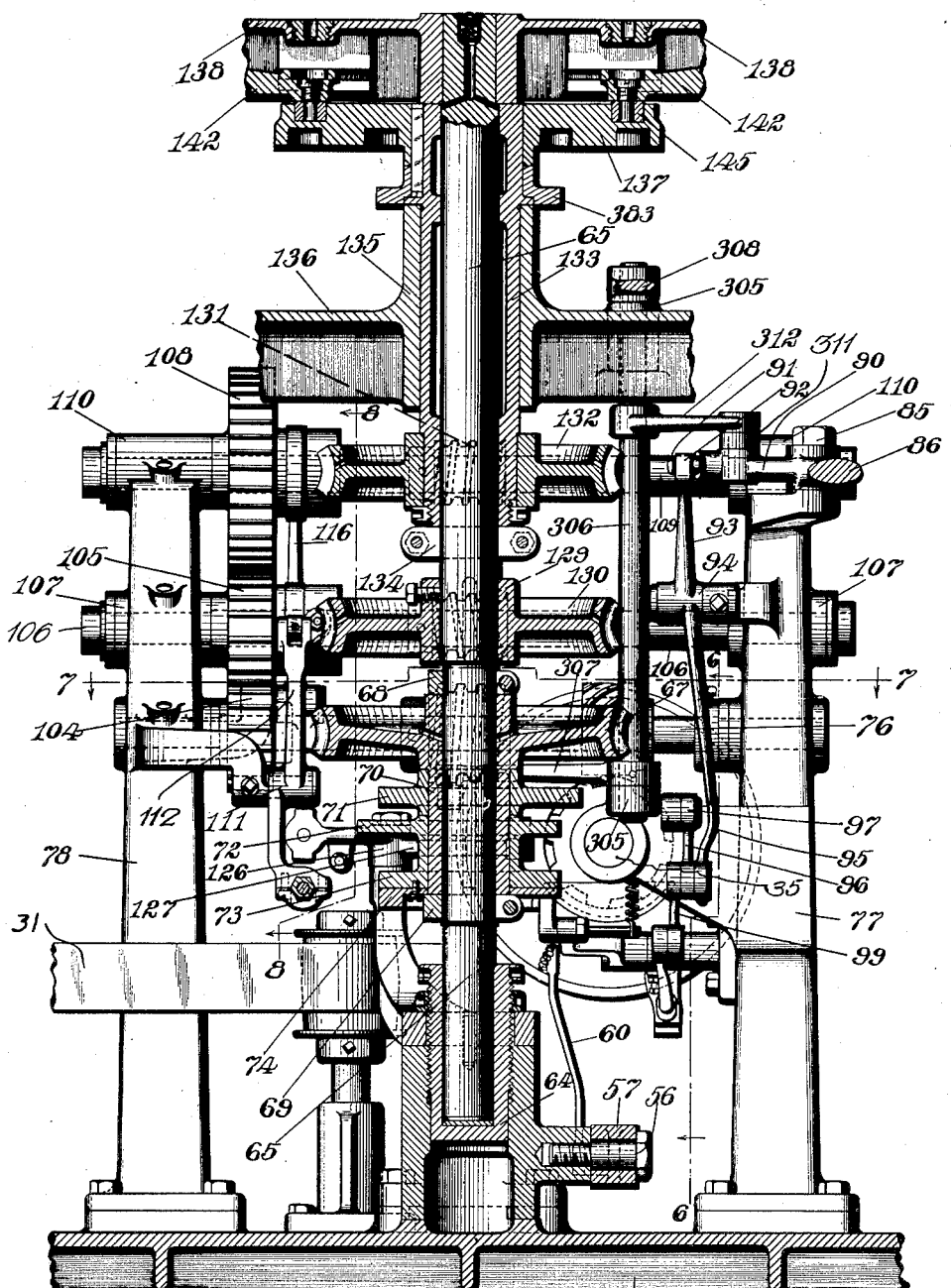
Fig. 5 is a transverse sectional elevation showing more particularly the means for automatically controlling the table, the jack operating mechanism, the clutch, and operation of the tools.

Pivotally mounted at 56, Figs. 5 and 6, is a jacking treadle 57, the foot engaging end of which is normally held elevated by a spring 58, Fig. 6. Connected to the jacking treadle 57 at 59, Fig. 6, is an arm 60 the upper end portion of which carries a catch 61 adapted at times, as will presently appear, to engage a lug or projection 62 mounted on the clutch shifting lever 54. A spring 63 normally tends to engage the catch 61 with the lug 62, the construction being such that with the parts in position as indicated in Fig. 6 should the jacking treadle 57 be depressed the catch 61 will be lifted to carry its shoulder above the lug 62, whereupon the spring 63 will engage the catch with the shoulder and upon release of the jacking treadle 57, the arm 60 will be pulled downwardly to thereby turn the lever 54 contraclockwise and permit engagement of the clutch members 40 and 46 to start the machine.

Mounted in a suitable step bearing 64 on the machine base 1 Fig. 5, is the table spindle or shaft 65 to the upper end portion of which is secured the table or carrier, the characteristics of which will be more fully described.

The spindle or shaft 65 has loosely mounted thereon the worm wheel 67, Figs. 5, 6 and 7, which is confined between suitable collars 68 and 69 secured to the spindle or shaft 65. The hub 70 of the worm wheel 67 is elongated as indicated in Figs. 5 and 6 and has secured thereto a series of cams 71, 72, 73 and 74 for controlling the operative or inoperative condition of parts as will more fully appear.

The worm wheel 67 is operatively engaged with a worm 75, Figs. 6 and 7, secured to a transverse shaft 76 rotatably mounted in suitable bearings formed in the risers 77 and 78 projecting upwardly from the machine base, substantially as indicated in Fig. 5. The shaft 76 is driven from the clutch member 46 through an appropriate train of connecting mechanism which, in the present instance of the invention, comprises a worm wheel 79, Figs. 6 and 7, operatively engaged with a worm 80 formed as part of or secured to the sleeve 45, the construction being such that when the clutch members 40 and 46 are engaged the worm wheel 67 and its connected hub 70 carrying the cams 71, 72, 73 and 74 will be continuously rotated.

When the clutch members 40 and 46 have been operatively engaged by contraclockwise movement of the lever 54 in the manner hereinbefore described, it is desirable that such lever be maintained in position with the clutch members engaged to maintain the series of cams 71, 72 and 73 in operative control of the table, the jacks or work supports thereon, and tools, as will more fully appear, until the tools have completed their respective operations upon the heels of the shoes presented thereto and a finished shoe has reached the jacking station, and that then the parts be controlled so as to prevent further operation until the finished shoe is removed and another jacked at the jacking station. To this end the hub 70, Fig. 6, carries the cam 74 which may be appropriately formed on the face of the cam 73 and the cam 74 has a depressed portion 81. The lever 54 carries a projection or rider 82 over which the cam 74 travels, the construction being such that when the lever 54 is turned contraclockwise in the manner hereinbefore described, and the cam 74 is turned through the means stated, the projection or rider 82 will travel along the face of the cam and hold the lever 54 in position with the machine in operation. Projecting from the face of the cam 74 is a pin 83, Fig. 6, which, as the cam 74 rotates is adapted to engage the catch 61 on the arm 60 and disengage the catch from the lug 62, so that after the projection or rider 82 has engaged the high part of the cam 74, the lever 54 is freed from control of the jacking lever 57 and will remain with the clutch members 40 and 46 in engaged relation until, in the rotation of the cam 74, the depressed portion 81 thereof comes opposite the projection or rider 82, whereupon, the lever 54, under the impulse of a spring 84, Fig. 6, will be turned clockwise, Fig. 6, to disengage the clutch members 40 and 46 and stop operative movement of the machine.

In addition to the means described for controlling the engagement and disengagement of the clutch members 40 and 46, other means are provided in order to stop the machine at the will of the attendant, as will now be described.

Figure 4:
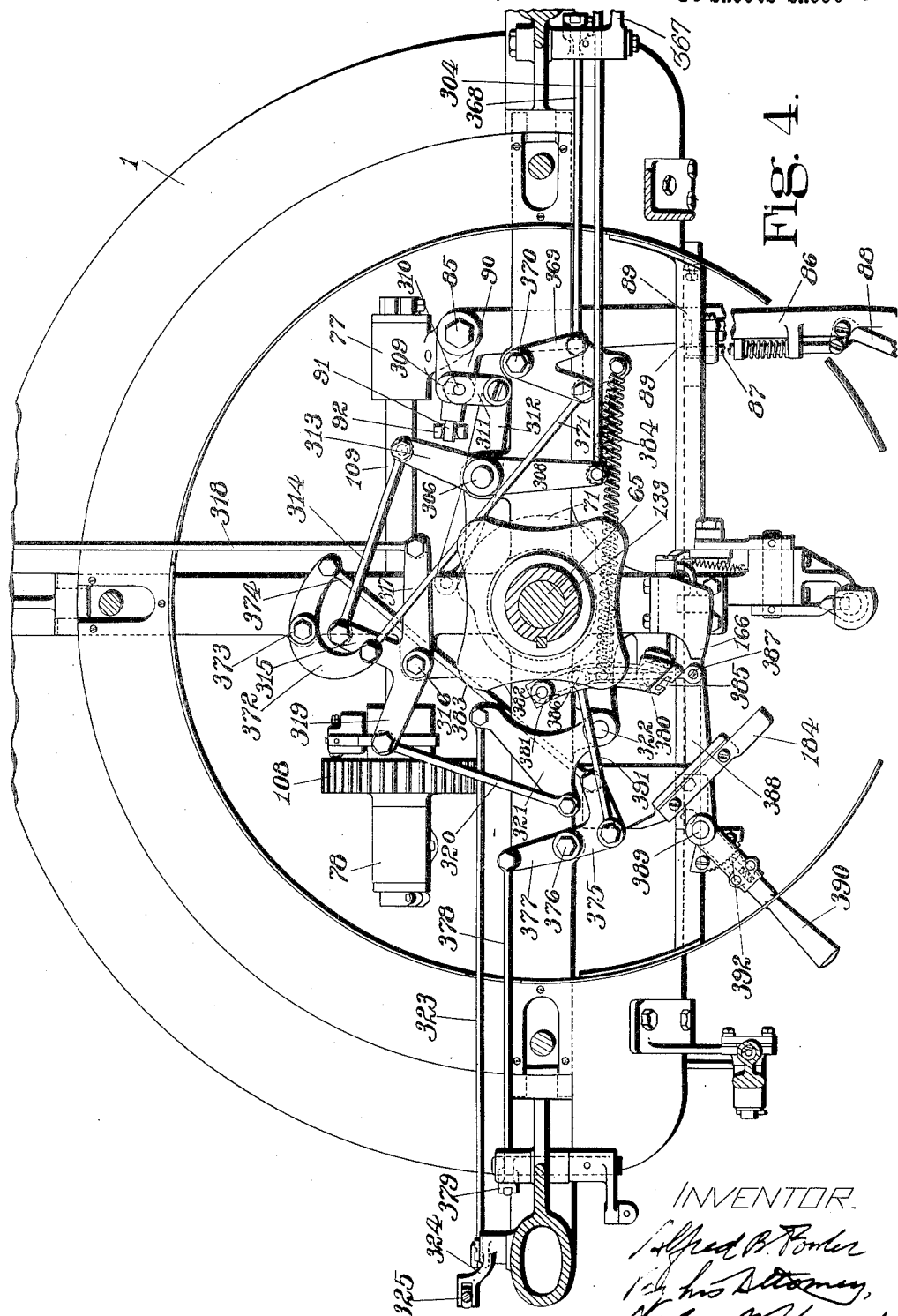
Fig. 4 is a horizontal section on the line 4—4 of Fig. 3.

Pivotally mounted at 85, Figs. 4 and 5, is an emergency lever 86 which extends to the front of the machine near the jacking station in convenient reach of the attendant. The emergency lever 86 as indicated in Fig. 4, has a locking pin 87 and a hand control grip 88 whereby the emergency lever may be moved about its pivot 85 and held in desired position by suitable locking recesses 89 formed in a portion of the machine frame as indicated in Fig. 4. The emergency lever 86 has a projecting arm 90, Figs. 4 and 5, which terminates in a pin 91 engaged with the bifurcated end 92 of a lever 93 pivoted at 94 on a bracket or lug secured to or formed as part of the riser 77.

The lever 93 has a downwardly projecting arm 95, Figs. 5 and 6, the lower end portion of which is connected to a toggle for controlling the clutch member 46. In the present instance of the invention the toggle comprises the link 96 pivoted to a bracket at 97 fixed to the machine frame and connected at its other end at 98 to the other toggle member 99, Figs. 5 and 6, the lower end 95 of the lever 93 having a slotted connection with the joint of the toggle at 98, as illustrated in Fig. 6. The toggle member 99 is connected at 100, Fig. 6, to the end of a lever 101 mounted for pivotal movement at 50 and carries an adjustable pin 102 adapted, when the lever 101 is moved downwardly by straightening the toggle, to engage the end of a finger 103 projecting from the clutch shifting arm 49, the construction being such that should the emergency lever 86, Figs. 5 and 6, be turned to the right, Fig. 5, the lever 93 will be rocked to cause the lower end 95 thereof to straighten the toggle and disengage the clutch member 46 from the clutch 40, thereby stopping rotative movement of the hub 70 and the cams carried thereby and consequently suspending the operative movements of the table and jacks mounted thereon. Shifting movement of the emergency lever 86 has additional functions with respect to the movement of the tools from operative position when the emergency lever is actuated with jacked shoes in position for treatment by the tools and this characteristic of the invention will later appear.

The shaft 76, Figs. 5, 6 and 7, has secured thereto a pinion 104 which is operatively engaged with a pinion 105, Fig. 5, loosely mounted on the shaft 106 appropriately journaled in bearings 107 sustained by the uprights or risers 77, 78, Fig. 5. The pinion 105 meshes with a gear or pinion 108, Fig. 5, loosely mounted on the shaft 109 appropriately supported in bearings 110 sustained by the risers 77, 78 as indicated in Fig. 5. The pinions or gears 105, 108, are adapted to be operatively connected to their respective shafts under control of the cams 72, 73 heretofore described as rotatable with the worm 67.

In the illustrated machine the hub portions of the gears or pinions 105, 108 are adapted to be clutched to their respective shafts under the control of Horton clutches but, of course, other forms of clutches might be employed. Pivotally mounted at 111, Figs. 3, 5 and 8, is a lever 112 having an upwardly spring impelled member 113ˣ adapted to engage the shoulder 114 connected with the usual roll carrier or cage of a Horton clutch. Similarly there is pivoted at 115, Fig. 8, a lever 116 having a similarly supported spring member 117ˣ adapted to engage with a shoulder 118 connected to the cage of the usual Horton clutch, the construction being such that should either of the members 113ˣ or 117ˣ engage with its respective shoulder of the associated Horton clutch, such clutch will be rendered ineffective and the gear or pinion with which it is associated will be operatively disconnected from its shaft. The pins 113 and 117 carried by the member 113ˣ and 117ˣ may hold their respective shafts from rotation when in stopped position by entering suitable holes in the usual cam part of the clutches.

The lower end portion of the lever 112 is connected by an adjustable rod 119 with a lever 120, Figs. 3 and 8, pivoted at 121, Fig. 3, and having an arm 122 carrying a roller 123 adapted to bear upon the peripheral portion of the cam 73. Similarly the lower end of the arm 116, Fig. 8, is connected by an adjustable rod 124, Fig. 8, with an arm 125 pivoted at 126 and having an arm 127, the end of which carries a roller bearing against the peripheral portion of the cam 72. Between the arms 120 and 125, Fig. 8, is interposed a spring 128, Fig. 8, for normally pressing the free ends of the arms 120 and 125 away from each other and, perforce, the other ends of the arms carrying the rolls against their respective cams, the construction being such that under the dictates of the cams 72 and 73 the Horton clutches heretofore described will be appropriately operated to connect their respective gears or pinions 108 or 105 to the shafts 109 and 106 respectively. The pinions 105 and 108 are continuously driven by gear 104 when the table and jack operating clutch is closed, and the shaft 106 or 109 will be operated whenever its associated clutch is operatively connected to it.

The shaft 106 has secured thereto a worm 129 which is engaged with a worm wheel 130, Fig. 5, secured to the table spindle or shaft 65, the construction being such that when the gear or pinion 105 is secured to its shaft as hereinbefore described, the table will be appropriately rotated.

The shaft 109 has secured thereto a worm 131, Fig. 5, which is engaged with a worm wheel 132 secured to a sleeve 133 Fig. 5, loosely mounted upon the table spindle or shaft 65 and supported vertically thereon by means of a collar 134. The upper end of the table spindle or shaft 65 and the sleeve 133 find suitable bearing 135 in the upper portion of the cross frame 136, Fig. 5. Secured to the upper end of the sleeve 133 Fig. 5, is a jack controlling cam 137.

The table or carrier for carrying the shoe supports or jacks, of which there may be any suitable number arranged in a circular series, may be variously contrived and secured to the table spindle or shaft 65, but in the present instance of the invention the table comprises the four arms 138 each of which carries a shoe support or jack. The space between the arms 138 may be appropriately covered as by suitable plates 139, Fig. 2, to thereby prevent chips and other foreign matter from finding its way to the working parts of the machine beneath.

Mounted in each of the arms 138 is a slide block 140, Figs. 10 and 12, such block 140 being mounted for sliding movement on its arm 138 in suitable ways or guides 141. Extending inwardly from each of the blocks 140 is an arm 142, the inner end of which has sliding engagement with a guide 143, Fig. 10, the construction being such that as the slide block 140 and arm 142 are moved radially of the table or arms 138 they will be suitably guided.

The jack controlling cam 137, which, as hereinbefore described, is secured to the sleeve 133, is provided with two cam surfaces or grooves one for controlling the inward and outward movement of the jacks relative to the table and the other of which is devised for controlling the rotative movement of the jacks and shoes thereon during the operation of the tool or tools upon the heel, the two cams acting conjointly during the heel treating operation by one of the tools to traverse the heels past the tool at appropriately varying speeds so that the tool shall treat equal extents of surface of the heel during each successive unit of time.

To effect the inward and outward movement of the jacks the cam 137 is provided with an upper cam groove 144, Figs. 10 and 12, which is engaged by a roll or pin 145 extending from the arm 142 on the slide block.

Mounted for rotative movement in the slide block 140 is the jack support 146, Fig. 10, to which is secured or splined a pinion 147, through the medium of which the jack to be hereinafter described is appropriately rotated. Mounted in the arm 142 of the slide block is a pin or support 148, Fig. 10, provided with a collar 149 between which and the arm 142 is a toothed segment 150, the teeth of which engage the teeth of the pinion 147. When the jacked shoe is operatively positioned relative to a tool, the present invention contemplates movement of the jack to move the presented shoe past the tool at angular speeds varying in inverse ratio to the distance of the part being treated from the centre about which the shoe is moved to cause the tool to act in each successive unit of time on a like extent of contour surface for treatment. But when the treated shoe reaches jacking position it is desirable that the jack shall be freed from its rotating means in order that the attendant may properly accommodate the shoe to the jack.

To these ends the pin 148 extends below the collar 149 at 151, Fig. 10, and is provided with a sleeve 152, a spring 153 being interposed between the sleeve 152 and a stop or nut 154, the construction being such that the spring 153 normally tends to lift the sleeve 152 on the pin 151. The sleeve 152 at its upper portion is provided with a locking pin 155, Fig. 11, which is adapted to engage a recess 156, Fig. 13, formed in the toothed segment 150 and, perforce, lock the toothed segment to the sleeve 152, when the two are brought into registering relation.

The sleeve 152 is connected by a link 157, Fig. 10, with an arm 158 pivotally mounted at 159 to a lug extended from the table arms 138. Each of the arms 158, of which there is one for each jack, has a roll 160, Figs. 10 and 12, adapted to engage appropriate cam tracks or grooves 161 formed in the under surface of the cam 137, the construction being such that when the cam and table are relatively moved and the sleeve 152 is locked to the segment 150, a condition which exists when the jack is in operative relation with the tool, the jack is suitably rotated as hereinbefore described at angular speeds varying in inverse ratio to the distance of the part being treated from the centre about which the shoe is moved to cause the tool to act in each successive unit of time on an equal extent of the shoe.

Figure 1:
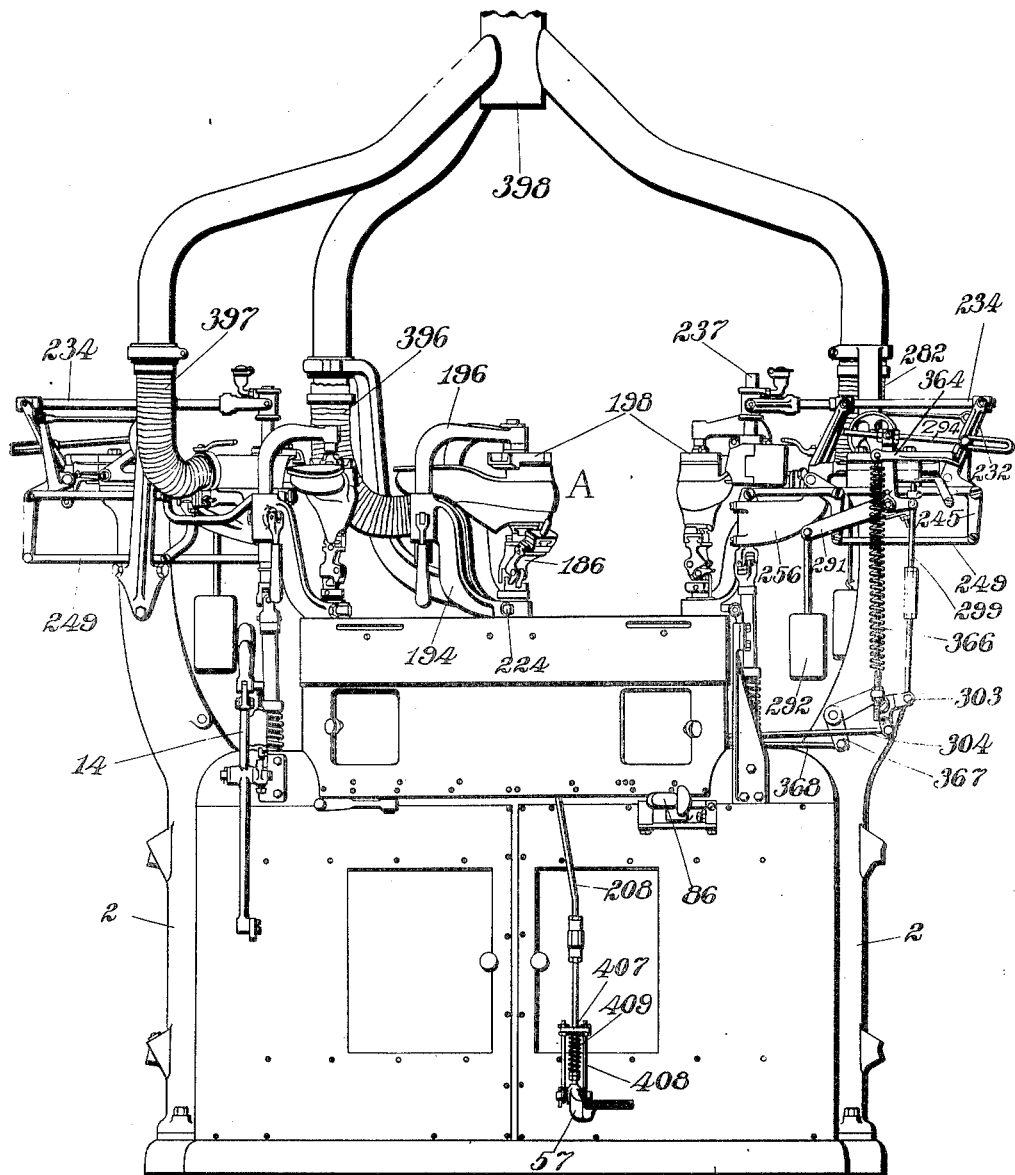
Fig. 1 represents a front elevation of a machine embodying the features of the present invention.

When the jack carrying a shoe, the heel of which has been treated by the tool, reaches jacking position at the front of the machine as indicated at A Fig. 1, it is desirable that the jack be released from its rotating means and be moved to a convenient position for the removal of the treated shoe and reception of a shoe to be treated. To this end a spring 162, Figs. 10 and 12, is connected to the toothed segment 150 so that when free to respond to the spring, the toothed segment may be rotated to turn the jack into an appropriate position for the removal of a jacked shoe and the reception of a shoe to be jacked.

Pivotally mounted at 163 are the arms 164, Figs. 10 and 14, of a bifurcated lever carrying at its end a roll 165, Fig. 10, adapted, as the jacked shoe approaches jacking position as indicated at A Fig. 1, to engage the inclined surface of a cam 166, Figs. 4 and 10, the effect being that as the jack approaches jacking position the roll 165 on the bifurcated lever will be depressed. The arms 164 of the bifurcated lever, as indicated in Fig. 10, are each provided with a pin or roller 167 which engages a circular recess 168 in the sleeve 152, the construction being such that when the jack is approaching jacking position the end of the bifurcated lever will be depressed and the locking pin 155 carried by the sleeve 152 will be withdrawn from the recess 156 in the toothed segment 150, whereupon the spring 162 will turn the jack into an appropriate position for convenient removal and reception of shoes and even though the cam 137 be thereafter rotated during the jacking operation, the jack will not partake of the rotary movement and may be conveniently manipulated by the attendant.

Figure 15:
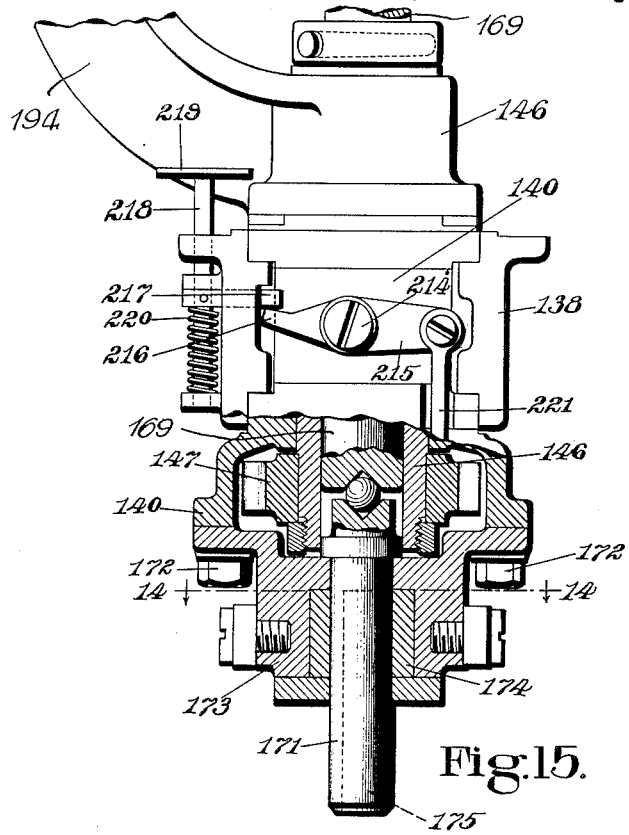
Fig. 15 is a front elevation on an enlarged scale looking in the direction of the arrow, Fig. 12, showing certain portions of the jacking and jack release mechanism.

Mounted for vertical movement in the jack block 146 is the jack spindle 169, Fig. 10, serving as an internal shoe clamping member, the lower end portion of which rests upon a ball bearing 170 interposed between the spindle 169 and a jacking plunger 171, the whole constituting a series of connections extending downward below the table, the construction being such that upon upward movement of the plunger 171 the jack spindle 169 will be raised. In order to hold the jack spindle in its raised or jacked position the present invention contemplates means permitting such upward movement of the jack spindle and for holding it in jacked position. To this end the jack slide 140 has connected thereto by bolts 172, Fig. 15, the cap piece 173 in which is mounted the hardened steel block 174 through which passes the jacking plunger 171. The jacking plunger 171 has a flattened face as at 175, Figs. 14 and 15, adapted to be engaged by a locking roller 176, Figs. 10 and 14, which acts as a one-way automatic pressure-retaining clutch as it rides along the inclined surface 177 of the block 174, Figs. 10 and 14, and under the impulse of a spring seats itself at the contracted portion of the space between the block and the flattened face 175 of the plunger to maintain the latter and, perforce, the jack spindle, in the raised or jacked position.

When a jack with a treated shoe thereon approaches jacking position as indicated at A, Fig. 1, it is not only desirable to have the jack free for attendant control rotatably as hereinbefore described, but the shoe should be unjacked. To this end the present invention contemplates the provision of means for automatically unjacking the shoe as the jack approaches jacking position. The steel block 174, Fig. 14, heretofore described as contained within the cap piece 173, has lugs 179 projecting therefrom in which is mounted a pin 180, Figs. 10 and 14. Secured to the pin 180 is a rocking lever 181, Fig. 10, having a catch releasing toe portion 182, adapted to engage beneath the locking roller 176 to lift the same and allow the jacking plunger and jacking spindle to drop down. Mounted on the rocking lever 181 is a roller 183, Fig. 10, which as the jack approaches the jacking station as indicated at A, Fig. 1, with a jacked shoe thereon, is adapted to engage a cam 184, Fig. 4, secured to the frame of the machine in the path of movement of the roll 183, the construction being such that as the jack approaches the jacking station the lever 181 will be actuated to unlock the jacking plunger 171 and permit the jack spindle 169 to drop, being thus guided by the jack support 146 to bring the series of connections by which the jacks are actuated to a normal position.

When the jacked shoe reaches the jacking station it should not only be unjacked for convenient removal but should be placed in convenient position for such removal and the jack parts arranged for convenient reception of another shoe. Pivotally mounted at 185, Figs. 10 and 21, is the jack block 186 carrying the last pin 187 and a spring plunger 188, the construction being such that when the jack block is free to swing into the position indicated in Fig. 10, the spring plunger 188 will move the jack block to such position. It is desirable, however, that when the jack block is turned into vertical position for jacking the shoe it should be locked in such position and then unlocked when the jacking plunger is unlocked to permit drop of the jack. Mounted on the head of the jack spindle 169 at 189, Fig. 10, is a locking catch 190, the end 191 of which is adapted to engage a shoulder 192 on the jack block 186 when the latter is turned into vertical position and a spring normally tends to throw the locking catch 190 into locking position. As the jack approaches jacking position and as the shoe is unjacked the jacking spindle 169 drops and in order to automatically unlock the jack block 186 at such time to permit the shoe to be swung outwardly for convenient removal, there is mounted upon the jack support 146, Figs. 10 and 21, a stop or trip 193 which, as the jack spindle drops during the unjacking operation hits the end of the latch 190 and unlocks the jack block 186 thereby permitting the spring plunger 188 to throw the block into its inclined outward position, as indicated in Fig. 10.

Where the heels of shoes are to be treated about the contour surface thereof, it is desirable that the shoe be jacked with the rand crease in a predetermined vertical position or that the jacking movement of the shoe be to a fixed point determined by the tread of the heel. Extending laterally from the jack support 146 is the arm 194, Figs. 10 and 21, having a sleeve 195 in which is adjustably mounted an arm 196 turned to overhang and serve as a stop for the shoe bottom, as indicated in Fig. 21, and having pivotally mounted thereon as at 197 an external clamping member in the form of a top lift plate 198, the shoulder 199 of which is adapted to engage the breast of the heel mounted on the jack when the shoe is in jacked position. Adjustment of the last pin 187 to permit proper positioning of the shoe with the breast of the heel in engagement with the shoulder 199 is facilitated by the dovetail sliding connections at right angles to one another between said pin 187 and the jack post 186. By means of the sleeve 195 and the clamp 200, Fig. 10, the top lift plate and, perforce, the position of the tread of the heel and rand crease may be predetermined for different heights of heels.

Secured to the machine frame, as indicated in Fig. 10, is a bracket 201 having a sleeve 202 in which is a plunger 203 having a head 204 adapted to engage the lower end of the jacking plunger 171 when the jack is in jacking position. The plunger 203 has a suitable recess to engage the head 205 of a jacking lever 206, Fig. 10, pivotally mounted at 207 on the machine frame and connected by the rod 208 to the jacking treadle 57 hereinbefore described, the construction being such that by depression of the jacking treadle 57 a powerful pressure of substantially any degree within a range may be applied to the jacking plunger 179 and a shoe mounted upon a jack in jacking position may be suitably jacked.

As hereinbefore described the act of jacking a shoe at the jacking station and the release of the jacking means or treadle 57 acts to start the machine into operation, and when a shoe has been transferred from the jacking station to a tool and has been treated by such tool, the machine automatically comes to a rest by movement of the projection 82 of the lever 54 upwardly into the recess 81 of the cam 74, Fig. 6. At this time the catch 61 on the arm 60 is disengaged from the lug 62, having been so disengaged by the pin 83 as before described, consequently the clutch members 40 and 46 being now out of engagement, the table movement as well as the movement of the jacks relative to the tools as they treat the contour surfaces of the heels, will be suspended until after the jacking operation is again performed and the jacking means or treadle 57 has been released. This is desirable because until a shoe is properly jacked at the jacking station it cannot be properly presented to the tool or tools, and if the jack at the jacking station were moved from jacking position by the table before a shoe is properly jacked, the jack would be moved away from the jacking instrumentalities and subsequent jacking of the shoe would be impossible. Consequently the initiation of table and jack movement to carry the jacked shoes to the tools and for moving them relative to the tools during the tool operations, are made dependent upon the operation and completion of the jacking means to thereby insure that before these operations are inaugurated a shoe to be treated will have been properly jacked.

Figure 16:
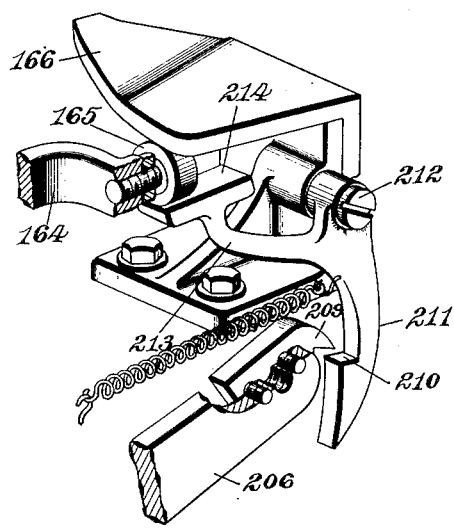
Fig. 16 is a detached detail showing the latch for locking the jacking treadle at times when a jack is not in jacking position.

It will therefore be apparent that after a shoe has been jacked and the machine has been started to carry the jacked shoe by movement of the table from jacking position to the tool for treating the shoe, it is important to prevent further manipulation of the jacking means until another jack has reached the jacking station and the shoes presented to the tools shall have been treated. The jacking lever 206, Fig. 10, is provided with a catch or toe 209 which is adapted to engage the shoulder 210 of a latch 211 pivotally mounted at 212, as best indicated in Figs. 10 and 16 and normally under the influence of a spring tending to place the shoulder in position beneath the toe 209. The latch 211 is also provided with an arm 213 having an end portion 214 adapted, as a jack approaches a jacking station, to be engaged by the roller 165 which moves with the jack to thereby swing the latch 211 from locking engagement with the jacking lever 206 and free the jacking mechanism for the jacking operation.

After a shoe has been jacked and before the jacking treadle is released, the attendant may find it desirable to again release the shoe so as to correct its jacked position. To this end the jack slide 140 has pivotally mounted thereon at 214′, Fig. 15, a lever 215 having a toe portion 216 underlying a ledge 217 carried by a manually operable pin or plunger 218, the head 219 of which may be engaged by the attendant and to depress the pin or plunger against the stress of a spring 220 to thereby rock the lever 215 to release the shoe. Connected to the lever 215 is a rod 221, Fig. 15, which, as indicated in Fig. 11, is pivotally mounted at 222 to a curved lever 223 secured to the rocking pin 180 carrying the unjacking lever 181, Fig. 10, the construction being such that after the jack lever 206 has been actuated to lift the jack and the latter is locked in its lifted position by the roller 176, as hereinbefore explained, the attendant may, by letting up slightly on the jacking treadle but without releasing it entirely, cause the jacking spindle 169 to drop by manipulation of the pin or plunger 218, thereby enabling him to correct the position of the shoe on the jack and thereafter complete the jacking operation.

When the jack is in jacking position as hereinbefore explained, the toothed segment 150 is operatively disengaged from the actuating means 152 and pin 155 so that the jack may be manipulated by the attendant in jacking the shoe. As the jacked shoe however approaches the first tool for treatment after being jacked, it is desirable to have the tool commence its action and that the jack be placed under control of its rotating means and to this end the jack support 146 is provided with a lug 224, Figs. 1, 2 and 10, which, as the jack approaches the first tool of the series, is adapted to engage a yielding stop 225 comprising a plunger 226 under the yielding influence of a spring 227, as indicated in Fig. 2, the construction being such that as the table carries the jacked shoe from the jacking station at A, Figs. 1 and 2, to the first of the series of tools for treatment, the lug 224 of the jack will engage the yielding stop 225 and the jack will be turned against the tension of its spring 162, Fig. 10, to bring the opening 156 in the toothed segment 150, Fig. 13, into register with the pin 155 carried by the sleeve 152 as hereinbefore described, thereby placing the jack automatically into or under the control of its rotating means.

In the disclosed embodiment of the present invention the first tool to which the heel contour of a shoe is presented for treatment is a cutter or trimming tool which is mounted for movement towards and from the work and for tilting movement relative thereto about a centre outside of the axis of the trimming tool or, in other words, about the rand crease as a centre. The second tool of the series as disclosed by the present embodiment of the invention is a randing tool, while the third tool of the series is a scouring tool. Obviously the character of the tool or tools may be varied to suit the character of work to be performed, but in the present instance of the invention where trimming, randing and scouring tools are employed, it is desirable to have both the trimming and the scouring tool mounted for movement about the rand crease as a centre in order that the contour surface of the heel may be properly treated by each of these tools and it is likewise desirable that the tilting force applied to each of these tools shall be so nicely balanced that there shall be no danger as the top lift guide moves over the top lift plate, of the tools being disturbed with respect to the desired relation between them and the contour surface of the heel. The trimming tool and the scouring tool, so far as their movements towards and from the work and tilting movement with respect thereto is concerned, may be the same or similar, and description of one will suffice for both.

Figure 17:
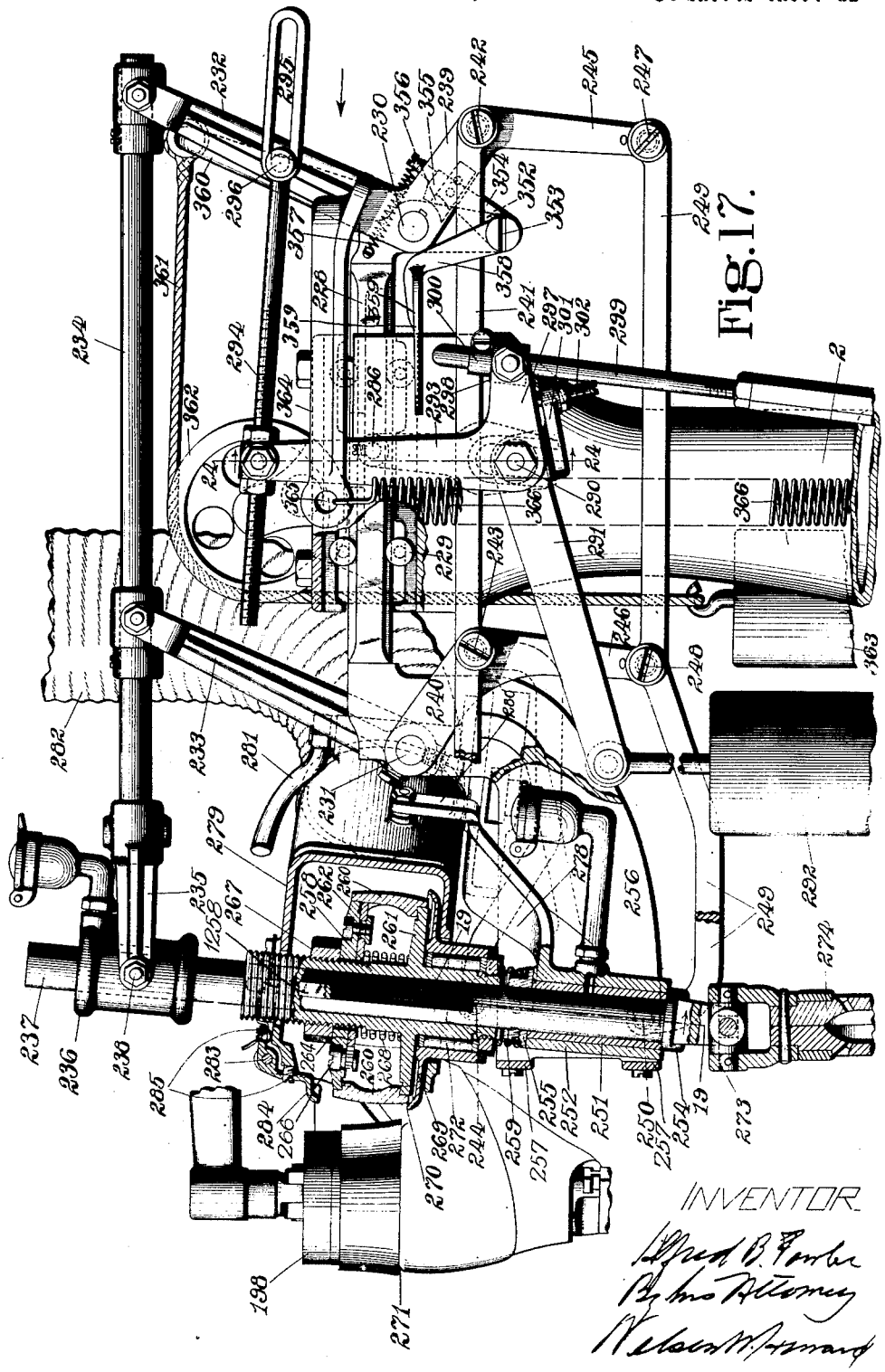
Fig. 17 is an enlarged side elevation with some of the parts broken away and others in section showing the heel trimming mechanism and its controlling means, the trimming tool being shown in section on the line 17—17, Fig. 20.
Figure 24:
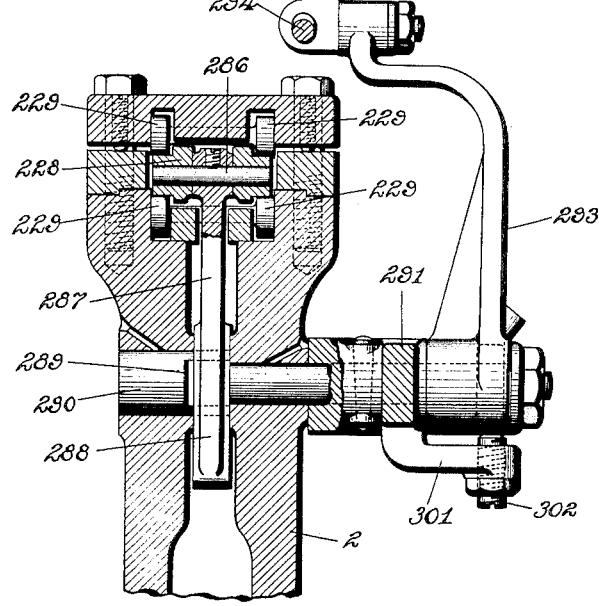
Fig. 24 is an enlarged detail sectional view on the line 24—24 of Fig. 17.

Mounted upon the top portion of the tool supporting standards 2 is a slide 228, Fig. 17, which may travel in suitable guide-ways and may be made sensitive with respect to its movement in the guide-ways by anti-friction means such, for instance, as the rollers 229 and their connecting shafts (Fig. 24). Mounted for rocking movement in the end portions of the slide 228 are the shafts 230 and 231, Fig. 17, from which rise the parallel arms 232 and 233. Mounted in the upper end portions of the arms 232 and 233 is the rod 234, Fig. 17, having a yoke 235 to which is pivotally connected at 238 the bearing 236 of the tool or cutter shaft 237, the construction being such that the tool or cutter shaft may rise and fall in the bearing 236.

Secured to the rock shafts 230 and 231 are the parallel arms 239 and 240 which are connected by similar rods 241 pivotally joined, one on each side of the column 2 to each of the arms 239 and 240 at 242 and 243 respectively. The rods 241 are extended towards the cutter or tool shaft and pivotally connected at 244, Fig. 17, to a lower bearing in which said shaft is mounted, the construction of which will be more fully described. One of these rods 241 is curved as shown in dotted lines in Fig. 17 to give clearance as the tool shaft 237 is tilted. Arms 239 and 240 are extended beyond the pivotal connections with the rod 241 as at 245 and 246 and at the lower portion of these extensions there are pivotally connected thereto at 247 and 248 rods 249, one at each side of the tool supporting column. These two rods, as indicated in Fig. 17, are extended towards the tool or cutter shaft and are pivotally connected to the lower bearing of said cutter shaft at 250.

Figure 25:
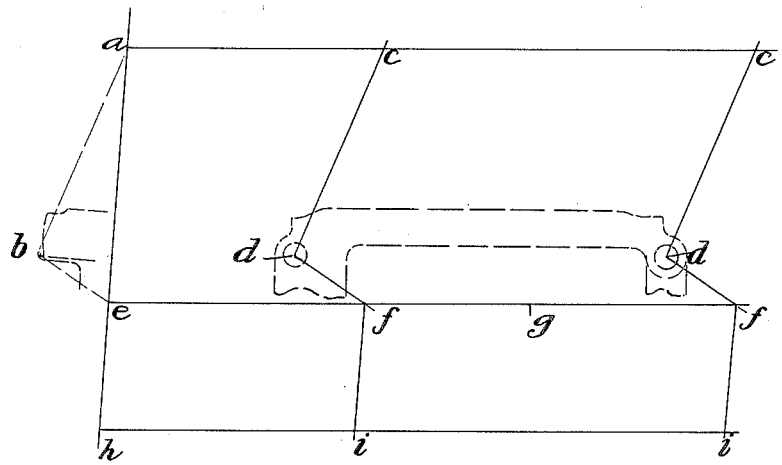
Fig. 25 is a diagrammatic view illustrating the relative movement of certain tool-carrying parts as the tool is tilted about the rand crease or edge of the rand guide as a centre.

It will thus be seen that the tool or cutter shaft 237 is connected to the slide 228 at three points 238, 244 and 250, such that by rocking movement of the arms about their pivotal connection with the slide the cutter shaft and, perforce, the tool mounted thereon, will tilt about a centre outside the axis of the shaft as later more fully discussed with reference to Fig. 25.

Figure 19:
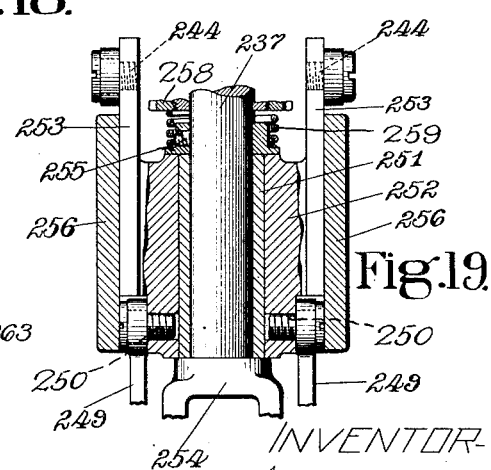
Fig. 19 is an enlarged detail section on the line 19—19 Fig. 17.

The cutter or tool shaft 237 is mounted at its lower end, as indicated in Figs. 17 and 19, in a bushing 251 carried by a sleeve 252, the side portions 253 of which are extended upwardly to receive the pivotal connections 244, Figs. 17 and 19, with the rods 241. The sleeve 252, as more clearly indicated in Fig.19, is pivotally connected at its lower portion at 250 with the arms 249. The lower extremity of the tool or cutter shaft 237 is provided with an enlarged bifurcated portion 254 on the shoulder of which rest the bushing 251 and the sleeve 252, said bushing and sleeve being maintained in the described position by a collar 255 secured to the cutter shaft 237 above the bushing and the sleeve.

Extending from the slide 228 are the guide arms 256 (Figs. 17 and 19) one at each side of the bushing 252, whereby movement of the bushing and, perforce, of the cutter shaft is confined to a vertical plane between the guides 256. These parts are the same as corresponding parts associated with the scouring tool and are similarly illustrated in Fig. 23. As shown in said Fig. 23 the guides 256 which project from the slide 228 are connected by the cross braces 257.

Figure 20:
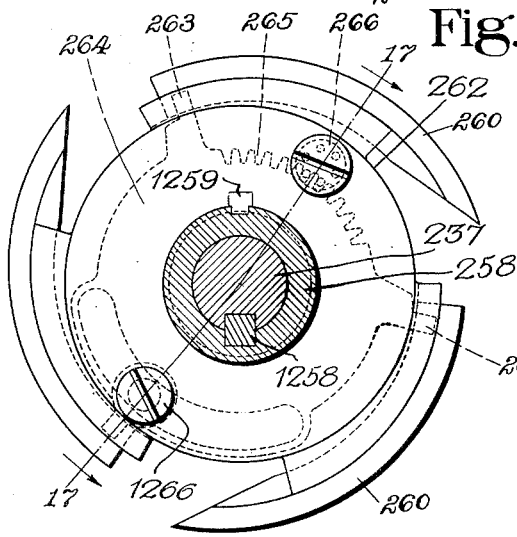
Fig. 20 is an enlarged detached detail and sectional view showing the heel trimmer or cutter and the manner of adjusting the trimming blades.

Mounted on the tool or cutter shaft 237 is the tool or cutter which, in the present instance of the invention, comprises a hub portion 258, Fig. 17, loosely mounted on the tool or cutter shaft 237 and preferably supported for floating movement longitudinally of the shaft by a spring 259 interposed between the lower end of the bushing 258 and the collar 255 hereinbefore described. The hub 258 of the cutter is constrained by a spline 1258 to rotate with the shaft 237. The cutter may be of usual construction but the preferred character of cutter as shown in the present form of the invention comprises the separate cutter pieces 260 disposed between the lower and upper flanges 261 and 262 of which the latter is splined at 1259 to the bushing 258. The cutters or blades 260 have socketed portions which are positively engaged by the fingers 263, Fig. 20, of an adjusting piece 264 having a series of teeth 265 by which through the hand piece 266 the blades may be simultaneously adjusted in either direction between the upper and lower flange pieces 262 and 261 respectively and clamped in adjusted position by the bolt 1266. Threaded to the hub 258 of the cutter is the nut 267 which, when the cutter blades are placed in the position indicated in Fig. 17, may be screwed down upon the upper flange 262 to maintain the parts of the cutter in proper adjusted position.

Between the lower and upper flanges 261 and 262 of the cutter is interposed a spring 268, Fig. 17, which, when the nut 267 is run back lifts or counterbalances the upper flange 262 and permits the cutter blades to be tilted outwardly from their operative connection with the flanges when it is necessary to remove the blades, as for sharpening.

Freely rotatable on the lower portion of the hub 258 of the cutter is the rand guide 269, the edge portion 270 of which is adapted to engage the rand crease 271 of a jacked shoe presented to the tool for treatment. In order that the rand guide 269 may not injure the upper by rotative movement it is supported upon the hub of the cutter by means of anti-friction rollers 272 Fig. 17, so that when the rand guide is engaged with the rand crease it will revolve slowly by its contact with the shoe.

When a jacked shoe is presented to the tool for treatment the present invention contemplates that the engaging edge 270 of the rand guide may preferably be located slightly below the rand crease of the jacked shoe as indicated in Fig. 17, and as the tool is moved towards the work and into operative relation therewith the engaging edge of the rand guide may first encounter the vamp or upper of the shoe where it curves into the rand crease and thereupon creep over the curved vamp into full engagement with the rand crease. This action is permitted by the counter-balancing spring 259 and the spline 1258 connecting the hub 258 of the cutter and rand guide with the cutter shaft.

The lower end of the tool or cutter shaft 237 is connected at 273, Fig. 17, by a universal joint with a hollow shaft 274 which, when operatively connected with the tool driving shaft 23 (Fig. 3) receives the angular portion 275 of an intermediate shaft 276 having a universal joint connection at 277 with the cutter or tool operating shaft 23, the construction being such that while the tool will be caused to rotate with the shaft 23 it will be free to move towards and from the work and longitudinally with respect to said shaft.

As hereinbefore indicated an important feature of the present invention consists in mounting the tool or cutter for tilting movement about a centre outside the axis of the tool shaft and in a predetermined plane or about the rand crease as a centre. This automatic tilting movement of the tool to conform it to the inclination of the surface being treated will be best indicated in the diagrammatic view of Fig. 25. In this diagram the line $a$—$b$ drawn from the pivotal support at the upper end of the cutter shaft to the edge of the rand guide, it will be noted, is parallel to the lines $c$—$d$ representing the arms 232 and 233, Fig. 17, and that a line drawn from the edge of the rand guide at $b$ to the point $e$ which represents the pivotal connection 244 of the rods 243 with the cutter shaft bearing is parallel to the lines $d$—$f$, representing the arms 239 and 240, connecting the axes $d$ with the line $g$ representing the rod 241, Fig. 17. Likewise a line $e$—$h$, it will be noted, is parallel to the lines $f$—$i$ representing the arms 245, 246 of Fig. 17, so that pivotal movement of the arms $c$—$d$ and $d$—$f$ about the points $d$ as a centre will cause the cutter shaft represented at $a$—$h$ to be moved about the point $b$ as a center, such point representing the edge of the rand guide and being a point which is fixed by the construction of the mounting irrespective of the position of the shoe. It will be remembered that the heel presenting means is adjustable determinately to vary the relation between the heels and the axis of tilting of the tool.

Mounted upon the slide 228, Fig. 17, as by means of a suitable bracket arm 278 is an air casing 279 which surrounds or nearly surrounds the tool or cutter. The casing 279 is supported upon the arm 278 by means of an upright 280, Fig. 17, and is clamped thereto by the hand clamp 281. The casing 279 is connected by a conduit 282 to a suitable suction device whereby as shavings are produced by the cutter they are carried away.

The present invention contemplates that while the rand guide travels in the rand crease and the tool is appropriately tilted about the rand crease as a centre, that the top lift plate 198 shall in connection with a top lift guide, define the tilted position of the tool or cutter at any stage of its cutting action. To this end in the present instance of the invention the casing 279 has positively mounted thereon at 283, Fig. 17, a top lift guide 284 the edge of which is adapted to bear against the top lift plate 198. suitable adjusting means 285, such as set screws, may be employed for adjusting the position of the contacting edge of the top lift guide with the top lift plate, the construction being such that as the heel of the shoe is moved past the tool or cutter at varying speeds to submit to the cutter action a like extent of contour surface in successive units of time, the top lift guide will, by contacting with the top lift plate, determine the tilted position of the tool or cutter in conformity with the desired inclination of the heel between the edge of the heel seat and top lift.

When a shoe is not positioned for treatment, it is desirable that the tool or cutter shall be moved backward out of cutting position to permit a shoe, the heel of which is to be treated, to be moved into position for treatment. To effect movement of the tool towards and from operative position the slide 228 has pivotally connected thereto by a pin 286, Figs. 17 and 24, a depending arm 287 the lower end portion of which is bifurcated at 288 to embrace a flattened portion 289 of a shaft 290 mounted in the upright or tool supporting column 2. Secured to the shaft 290 is an arm 291 to the end of which is suspended a weight 292, the construction being such that the weight normally tends to move the tool or carrier towards working position by rotating the shaft 290.

Loosely mounted upon the shaft 290 is a bell crank lever 293. Figs. 17 and 24, the upper end of which is adjustably connected to a link 294 having a slotted end portion 295 through which passes a pin 296 connected to one of the parallel motion arms 232. The other arm 297 of the lever 293 carries a swivel block 298 through which passes the rod 299 having a collar or shoulder 300 secured to the rod 299 above the swivel block 298, the construction being such that while the rod 299 may move upwardly independently of the lever 293, any downward movement thereof, after the collar 300 has engaged the block 298, will cause movement of the lever about its axis 290. Projecting from the weighted arm 291 Fig. 17, is a finger or toe portion 301 preferably formed integral therewith and provided with an adjustable screw or other device 302 which is adapted to engage the arm 297 of the lever 293, when the rod 299 is pulled downwardly, the construction being such that upon downward movement of the rod 299 the slide 228 and, perforce, the tool or cutter will be moved backward away from the work and the cutter shaft will be tilted backwardly.

The rod 299 is connected at its lower end to one arm of a bell crank lever 303, the other arm of the bell crank 303 is joined to a rod 304, Figs. 1 and 4, and through the rod 304 and the bell crank lever described automatic and manual withdrawal of the tool or tools from operative position is effected as will now be described.

Mounted in suitable bearings 305 on the machine frame, see Figs. 4 and 5, is the vertical shaft 306, the lower portion of which carries an arm 307 carrying a roller which travels along the cam 71 secured on the hub 70 surrounding the table shaft 65. Secured to the upper end portion of the shaft 306 is an arm 308 which is connected to the rod 304, the construction being such that when the roll carried by the arm 307 rests upon the high portion of the cam 71, the rod 304 will be drawn to the left, Figs. 1 and 4, and each of the tools will be withdrawn from operative position. The action of the cam 71 is such that when the tools have finished their treatment of the pieces of work the high part of the cam will ride under the roller carried by the arm 307 and move the tools simultaneously backward away from the work even though the work remains in operating position. Thus the cam and associated levers serve to move the tools simultaneously to and from active position with respect to the work supports in timed relation of the movements of the conveyor.

As hereinbefore pointed out it is desirable at times to stop the operative condition of the machine through the emergency lever 86. If the machine should be stopped when shoes are in position for treatment by the tools it is desirable that the tools be withdrawn from operative position when the machine is stopped by the emergency lever.

The arm 90 of the emergency lever has formed therein an elongated slot 309, Fig. 4, which is engaged by a pin 310 carried by a link 311 which is pivotally connected to an arm 312 Figs. 4 and 5, carried by the shaft 306, the construction being such that should the emergency lever be actuated to stop rotation of the table as it moves to carry a shoe into position for treatment, the pin and slot connection 309 and 310 permits such movement of the emergency lever without effecting movement of the tools which at such time have been moved into a backward or inoperative position by the cam 71 as hereinbefore described. If, however, the emergency lever be actuated when the shoe or shoes are in operative position for treatment by the tools, at which time the tools are moved towards the work under control of the cam 71 as described, such actuation of the emergency lever will act through the pin and slot connection 309 and 310 not only to straighten the toggle and stop the movements of the jacks, but will also act through the lever mechanism described to move the tools backward into an inoperative position so that they do not continue to act upon the work at such times.

Where a plurality of tools are employed, as in the present instance of the invention, it is expedient to have them all under control of the automatic means and the emergency means for moving them towards and from operative position, and to this end the several tools are connected, by the mechanism to be described, to the rock shaft 306, Fig. 4.

Secured to the rock shaft 306 is an arm 313 which, by means of a link 314 is connected to one member 315 of a three-armed lever pivoted at 316 to a convenient support on the machine frame. Another arm 317 of the three-armed lever is connected by a rod 318 to the rand tool slide through a bell crank lever similar in all respects to the bell crank lever 303 and rod 299 already described in connection with the trimming tool.

The third arm 319, Fig. 4, of the three-arm lever is connected by a link 320 to a lever 321 pivoted at 322 to a convenient supporting portion of the machine frame and such lever 321 is connected by a rod 323 to a bell crank lever 324 similar in all respects to the bell crank lever 303 heretofore described with respect to the trimming tool and such bell crank lever 324 is connected by a rod 325 similar to the rod 299 previously described for the trimming tool for controlling the position of the scouring tool, the construction being such that when the shaft 306 is rocked either automatically by its cam 71 or through the emergency lever, the several tools will be moved towards or away from operative position.

It is convenient at this time to describe the randing tool and its mounting. Supported for movement towards and from the work on the work supporting column 2 at the rear of the machine is a slide 326, Fig. 21, which, like the slide for the trimming and scouring tools, may be supported by anti-friction means interposed between it and the guideways of the tool supporting column. Mounted for rocking movement in the column 2, Fig. 21, is the rock shaft 327 to which is secured an arm 328 carrying a weight 329. Pivotally connected to the slide 326 at 330 is an actuating arm 331 the lower bifurcated end portions 332 of which embrace flattened sections of the rock shaft 327, the construction being such that should the rock shaft 327 be rocked the slide 326 will be moved in its guides. Loosely connected to the rock shaft 327 is an arm 333 Fig. 21, which as already described with respect to the trimming tool is adapted to be rocked clockwise, Figs. 4 and 21, by rod 325 to move the rand tool carrying slide 326 back or away from operative position. The weighted arm 328 has a toe portion 335 in which is an adjusting screw 336. As the arm 333 is turned clockwise as described, it engages the adjusting screw 336, rocks the shaft 327 and withdraws the rand tool carrying slide backward or away from operative position. The rod 325 at its lower end is connected to a bell crank lever (not shown), which is connected to the rod 318, Fig. 4.

The rand tool carrying slide 326 is provided with the arms 337 in which are adjustably mounted the bearing supporting rods 338 each carrying a bearing 339 for the rand tool shaft 340. The rand tool shaft 340 has mounted thereon the rand tool which comprises a hub portion 341 having a lower disk 342 formed as a flange on the hub portion between which disk 342 and an upper disk 343 are adapted to be clamped the randing tools or blades 344, Figs. 21 and 22. To insure stable support of the randing tools or blades 344 one of the disks between which the blades are clamped may be provided with a countersunk portion as indicated by dotted lines 345, Fig. 22, to engage corresponding portions formed on the blades. The upper disk 343 is connected to the hub portion 341 of the randing tool by screw threads as at 346, Fig. 21, whereby the two disks may be moved towards each other to clamp the randing blades between them. Loosely mounted on the hub portion 341 of the randing tool below the disk 342 is the rand guide 347, the edge of which is adapted to engage the rand crease, and in order that the randing guide may engage the shoe at the curve of the vamp or upper leading into the rand crease and then creep over the curve and into the rand crease, the randing tool and guide are mounted for floating movement longitudinally of the shaft 340 by being splined thereto and counterbalanced by a supporting spring 348, Fig. 21, in a manner similar to the mounting of the trimming tool already described.

The randing tool shaft 340 extends downwardly and is connected by a universal joint 349 to the hollow shaft 350, Fig. 21, into which telescopes the flattened upper portion of an intermediate shaft similar to the shaft 351, Fig. 3, the construction being such that the randing tool shaft and tool may be moved towards and from the work while still maintaining its operative connection with the operating tool shaft.

As hereinbefore noted the trimming tool and scouring tool are similarly mounted for movement towards and from the work and for tilting movement with respect thereto about the rand crease as a centre and the randing tool is mounted for movement towards and from the work but has no tilting movement. When the trimming and scouring tools are withdrawn from operative position it is desirable that they be locked or held in such position away from the work and inclined outwardly therefrom and that when the trimming and scouring tools are to be moved to operative position the lock be tripped. Depending from the slide 228 and the corresponding slide of the scouring tool, is a bracket 352, Figs. 17 and 18, to which is pivoted at 353 a locking finger 354 provided with a holding projection 355 adapted to engage a shoulder 356 preferably formed on one of the arms 239, or, if desired, to engage another portion of the link connections between the slide and tool. A spring 357 normally tends to move the locking finger into locking engagement with the shoulder 356. Secured to the shaft 353 is the trip arm 358, Fig. 17, having a portion 359 adapted to be engaged by the upper end of the rod 299 when said rod is lifted to permit the weighted arm 291 to move the tool towards the work into operative position, the construction being such that when the bell crank lever 303 is rocked contraclockwise, Fig. 1, through the means hereinbefore described, the rod 299 will be raised and its upper end will engage the portion 359 of the trip to thereby unlock the parts and permit the slide to move the tool towards the work and into operative position. As the slide thus moves the tool into operative position, the edge of the rand guide 270 creeps over the curve of the vamp into the rand crease, and means are provided for automatically tilting the tool about the rand crease as a centre. This means may take various forms, due regard being had to the fact that the tilting means should act so as to effectively tilt the tool and maintain the top lift guide in engagement with the top lift plate as the shoe is turned to present different portions of the contour surface to the action of the tool without at the same time exerting such force upon the tool as to force the rand guide out of the rand crease. In the present instance of the invention the rock shaft 230 has connected thereto an arm 360, Figs. 17 and 18, to which is attached a flexible connection 361 passing over a pulley or guide 362 and attached to a weight 363, the construction being such that the weight 363 acts delicately and in the nature of a counterbalance to bring the top lift guide 284 into contact with the top lift plate 198, Fig. 17.

During the action of the tool or tools from one breast corner of the heel to the other, it is necessary to tilt the tool or tools different degrees to conform them to the varying inclination of the heel between the edges of the heel seat and tread. The present invention provides an automatic means for effecting this varying tilting action with its attendant varying pressure against the work and further embodies means operable at the will of the attendant for changing the effectiveness of the automatic means.

Figure 18:
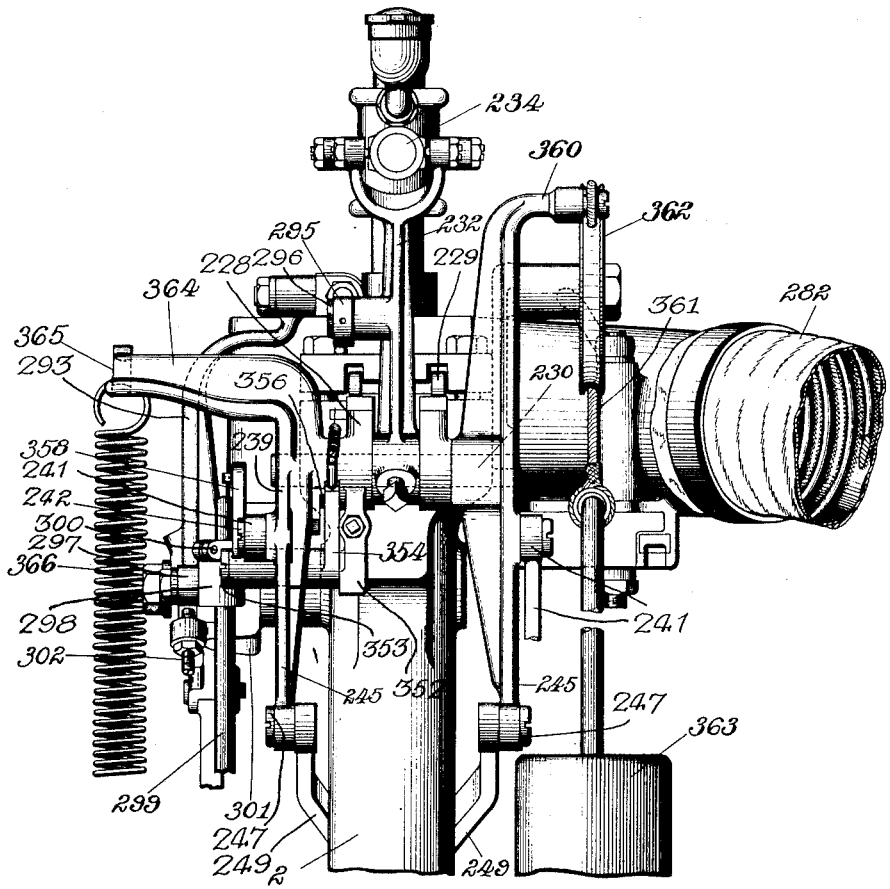
Fig. 18 is an end view of the heel trimming mechanism shown by Fig. 17 looking in the direction of the arrow Fig. 17.

Secured to the link connection between the tool shaft and the slide and preferably to the rock shaft 230, in the present instance of the invention, is an arm 364 to which is connected at 365 one end of a spring 366, Figs. 17 and 18, the other end of said spring being adjustably connected to one arm of a bell crank lever 367, Figs. 1 and 3, which serves as an abutment by means of which the spring is held under tension to apply a tilting force to the tool spindle supporting links. The other arm of said bell crank lever 367 is connected by a rod 368, Figs. 1 and 4, to a lever 369 pivoted at 370 to the machine frame. The lever 369 is connected by a rod 371 to a lever 372, Fig. 4, pivoted at 373 to a convenient part of the machine frame and having its other end connected by a rod 374 to a lever 375, Fig. 4, pivotally mounted at 376 on a convenient portion of the machine frame. The lever 375 has its arm 377 connected by a link 378 to a bell crank lever 379 substantially the same in all respects as the bell crank 367 already described, and said lever 379 is connected to the scouring tool by a spring and arm substantially in all respects the same as the spring 366 and arm 364, respectively, described in connection with the trimming tool, the construction being such that should the system of levers and links described be actuated they will act to place the spring 366 and the corresponding spring associated with the scouring tool under more or less tension according to the direction of actuation.

In order that this variation in tension of said springs 366 and consequently the tilting force applied to the tools may be automatically varied in a definite cycle corresponding to the cycle of operation of the tools as they pass from one breast heel corner to the other of a heel, there is pivotally mounted at 380, Fig. 4, an arm 381 having a roller 382 which bears upon the periphery of a cam 383, Figs. 3, 4 and 5, mounted for rotative movement on the table spindle or shaft 65 and preferably connected for rotative movement with the cam 137 as indicated in Fig. 5. The roller 382 of the arm 381 is held against the cam by an appropriate spring 384, Fig. 4, and such arm is connected to the lever 375, as will more fully appear, whereby as the cam 383 is rotated suitable variation in tension will be imparted to the springs 366 to effect tilting movement of the tools to conform to the varying inclinations of the heel from one breast corner to the other and to press the tool against the heel with a pressure progressively and automatically decreasing as the tool passes from the breast corner towards the rear of the heel and progressively and automatically increasing as the tool passes from the rear of the heel toward the other breast corner.

In addition to the automatic control of the tool tilting mechanism the present invention contemplates manual variation in the effectiveness of such control in order to suit different conditions of work. The arm 381, therefore, is preferably formed as a grooved segment best shown in Figs. 3 and 4, and in the groove 385, Fig. 4, of said segment is mounted a block 386 which is connected by a link 387 to an arm 388 pivoted at 389 and provided with a hand controlling arm 390, Fig. 4. The block 386 is thus movable to different positions in the segment slot 385 and is connected by a link 391, Fig. 4, to the lever 375, the construction being such that by adjustment of the block 386 to different positions longitudinally of the segment 381 the automatic action of the cam 383 upon the spring 366 may be modified to suit conditions of the work under treatment and such modification may take place under manual control during the operation of the machine. If desired, a suitable catch 392, Fig. 4, may be employed for holding the hand control lever 390 in adjusted position.

The particular means shown in the present embodiment of the invention for securing the scouring effect upon the heels, is represented in Fig. 23 as a sanding roll 393 mounted upon its shaft 394, which, as hereinbefore announced has movement towards and from the work and a tilting movement similar in all respects to the similar movements and means for imparting such movements described in connection with the trimming tool. The scouring tool shaft 394 is likewise connected to its operating shaft 28 by a universal joint 395 and a hollow shaft (not shown) adapted slidably to engage the squared shaft 351 (Fig. 3) connected to said shaft 28 as already described for the scouring tool and randing tool.

Each of the tools is provided with a casing which partially surrounds the tool and is connected to an air conduit for carrying away dust and particles produced during the action of the tools. These conduits are illustrated in Fig. 1 wherein is shown the conduit 282 already described connected to the casing surrounding the trimming tool, and a conduit 396 connected to the casing surrounding the randing tool, together with a conduit 397 connected to the casing surrounding the scouring tool, and said conduits are shown as conveniently leading to a common conduit 398 connected to suitable means for drawing air through the conduits to remove dust and cuttings from the tools.
As illustrated in Fig. 23 the casings may be appropriately formed of two portions 399 and 400 pivotally connected at 401 and held in closed condition by a spring catch 402, the construction being such that by tripping the spring catch 402 and loosening the hand clamps 281 (Fig. 17) or 1281 (Fig. 23), the casings may be removed from or applied to a tool. As indicated in Fig. 23 the casing 400 for the scouring tool has a rand guide 403 for engaging the rand crease of a shoe and an adjustable top lift guide 404 which may be secured to the casing by a securing bolt 405 passing through an elongated slot 406 in the shank portion of the top lift guide, the construction being such that the guide may be adjusted towards and from the work relative to the casing.

In the form of the invention herein described, the heels to be treated are secured to the shoe, but the invention in its more comprehensive aspect and with relation to some of the features thereof may advantageously be employed in the treatment of other parts of the shoe when the contour to be followed or treated changes as the tool progresses along the shoe, and likewise heels of shoes may be treated before they are secured to the shoe.

In the use of the machine, the shoes to be treated should be presented to the tools with the rand creases in approximately predetermined position. If the shoes are without lasts, their positions can be adjusted by varying the height of the jack posts or that part of the jack which goes inside the shoe, the movable clamping member acting upon the top lift in this case. In the illustrated embodiment of the invention, the machine is shown for the treatment of shoes having lasts in them, and as lasts vary in height at the heel portion, it is desirable to locate the rand crease, as hereinbefore stated, from a fixed position of the top lift.

The guide that acts upon the top lift plate while the shoe is being treated by the trimming tool, is adjustable relative to the axis of the tool, as described, but both the rand crease or counter guide and the top lift guide associated with the scouring tool are adjustable towards and from the axis of the scouring tool in order to regulate the depth of the scouring action and to account for reduction in the diameter of the tool due to reduction in thickness of its felt edge.
When the trimming or scouring tools are withdrawn from the work, the tool shaft is drawn into an approximately vertical position by the lever arm 287, rod 294, and stud 296, and held locked in that position until it has about reached the work in its inward movement, the spring 366 always tending to tip the tool, the purpose being to cause the rand guide to contact with the shoe in the most favorable position for causing it to find the rand crease.

To put the machine into use, the operator, standing opposite the jacking station A, places a shoe or heel upon the jack pin 187 and depressing the treadle raises the work into firm engagement with the plate 198 in such a position that the breast of the heel engages the depending lip 199 (Fig. 10) and is positioned on the jack thereby. As the work is pressed against the plate 198 by the action of the treadle, the jack spindle will be locked, in the position assumed, by means of the clutch roller 176.

Then, assuming that power has been applied by operation of the belt-shifting lever 14, the machine may be started by releasing the treadle. In depressing the jacking treadle 57, the catch 61 will have been raised and pulled by the spring 63 into position above the projection 62 of the clutch shifting lever 54. When, therefore, the treadle is released and is raised by the spring 58, the downward movement of the rear end of the treadle lever will turn the lever 54 (Fig. 6) counter-clockwise and permit engagement of the clutch members 40 and 46 to supply power to the work support mechanism. This will cause the rotation of the worm gear 67 with the cams 71, 72, 73 and 74 connected thereto and at the same time the rotation of the gears 104, 105 and 108. By the action of the Horton clutches under the control of the cams 72 and 73, first the gear 105 and then the gear 108 will be connected to their respective shafts so as to rotate first the spindle 65 carrying the table and then the sleeve 133 carrying the jack-controlling cam 137. This will cause the table to rotate through approximately ninety degrees to bring the piece of work just positioned upon a jack into position opposite the trimming tool blades 260, and it should be noted that, during the rotation of the table from jacking position A to the first work station, the lug 224 (Figs. 1, 2 and 10) will engage the stop 225, as indicated in Fig. 2, to the end that the jack will be turned against the tension of its spring 162 (Fig. 10) to bring the opening in the toothed segment 150 into register with the pin 155 (Fig. 11) carried by the sleeve 152, thereby placing the jack automatically under the control of its rotating means. At this time the toe of the shoe will point in a clockwise direction, looking down on the top of the machine, so that the trimming tool will be applied first to the forward corner of the heel adjacent to its breast and, as the jack is rotated to cause the work to pass by the tool, will treat the whole of the contour surface thereof up to the other corner, acting upon equal units of surface in successive units of time, until the shoe is in the position indicated in Fig. 2. Between this and succeeding stations of the machine relative movement of the jack-controlling cam 137 and the jack-carrying table will take place, which will cause an oscillation of the segmental gears 150 to return each of the jack spindles to such a position that the toe of the shoe is pointing clockwise around the table.

When the table is rotated to bring a jacking spindle and the piece of work carried thereby opposite the trimming tool, the tool-carrying slide 228 will be released from the lock 354 and moved forward by the weight 292 under the control of the cam 71 to bring the trimming tool into contact with the heel. Because of the supporting links provided, the tool shaft must tilt about an axis tangent to the edge 270 of the rand crease guide 269. In this tilting movement, it will be urged by the weight 363 into a position determined by the rand crease guide 269 and the top-lift follower guide 284. The tilting of the tool and its pressure against the work are automatically varied, during the cycle, by the cam 383 (Fig. 4). Manual variation of the effectiveness of this control may be added by operation of the lever 390 (Fig. 4). It will be recalled that, when the machine is in operation, the trimming, randing and scouring tools are rotating constantly. Under the action of the jack-controlling cam 137 (Fig. 12) the jack spindles will then be rotated through part of a revolution by means of the segmental gears 150, and this rotating movement will be compounded under the action of the slides 140 with an inward and outward movement, which will keep the contour surface of the heel in proper relation to the rotating tools and cause relative movement of the tools and the heels so that all parts of the contour surface of the heels will be treated.

The trimming operation finished, the rotation of the table when the jacking treadle is again released will bring the work into position opposite the randing tool 344 and cause a similar relative movement of the work with respect to said tool so that the contour surface of the rand will be treated.

Upon the next succeeding release of the jacking treadle, the particular piece of work under consideration will proceed to the next work station where it will be treated by the scouring tool 393. The control of the scouring tool is like that of the trimming tool.

Upon the next release of the jacking treadle, the rotation of the work-carrying table will bring the particular piece of work under consideration back again to the jacking station A and the jacking plunger 171 will be released by the engagement of the roll 183 (Fig. 10) with the cam 184 (Fig. 4) to allow the jacking plunger to drop so as automatically to unjack the shoe. As the jacking plunger falls, the jack block 186 will be released from the control of the latch 190 (Fig. 10) and the spring plunger 188 will tip the jack block 186 forward to facilitate the removal of the finished work and replacement thereof by another piece of work. At the same time the entry of the roll 165 (Fig. 10) under the cam 166 will separate the clutch members 149 and 152 and release the jacking plunger from its rotating means so that it may be turned freely for the application of work thereto. It will be remembered that this same roller 165 depresses the arm 214 to pull back the safety latch 211 and allow the operator again to depress the jacking treadle.

Having thus described my invention, what I claim as new and desire to secure by Letters Patent of the United States is:

1. In a machine of the character described, the combination of a heel treating tool, means for operating the tool at uniform speed for acting on the heel, means for presenting the heel of a shoe to the action of the tool, and means for moving the heel past the tool to cause the latter to treat the same extent of heel surface in successive equal units of time throughout the contour of the heel from one breast corner to the other.

2. In a machine of the character described, the combination of a heel treating tool, means for operating the tool at uniform speed for acting on the heel, a jack for presenting the heel of a shoe to the action of the tool, and means for moving the jack and heel past the tool to cause equal portions of the contour surface of the heel to be treated by the tool in successive equal units of time throughout the contour surface of the heel.

3. In a machine for manufacturing shoes, the combination of a tool, means for operating the tool at uniform speed, means for presenting the shoe for treatment by the tool, and means for moving the shoe past the the tool at varying speeds to effect treatment of equal portions along a changing contour in successive equal units of time throughout the contour presented for treatment.

4. In a machine of the class described, the combination of a plurality of heel treating tools, means for operating each of said tools at a uniform speed, means for successively presenting the heel of a shoe to the treatment of each of said tools and means for moving the heel at varying speeds as each tool acts upon the heel to cause each of said tools to treat the same extent of heel surface in successive equal units of time from one breast corner to the other.

5. In a machine of the class described, the combination of a trimming tool, a randing tool, and a scouring tool, means for successively presenting the heel of a shoe to the treatment of each of said tools, and means for moving the heel relatively to each of said tools as each acts upon the heel to cause the tool to treat the same extent of heel surface in successive equal units of time from one breast corner to the other.

6. In a machine of the class described, the combination of a trimming tool, a randing tool, and a scouring tool, means for operating said tools at uniform speeds, means for successively presenting the heel of a shoe to the treatment of each of said tools, and means for moving the heel relatively to each of said tools as each acts upon the heel to cause the tool to treat the same extent of heel surface in successive equal units of time from one breast corner to the other.

7. In a machine for treating boots and shoes, the combination of a tool, means for operating the tool at uniform speed, means for presenting a shoe to the tool, a cam, and connections between the cam and said latter means for turning the shoe past the tool at varying speeds to cause the tool to act upon the same extent of surface in successive equal units of time.

8. In a machine for treating the heels of boots and shoes, the combination of a plurality of heel treating tools, means for operating each of said tools at a uniform speed, means for successively presenting the heel of a shoe to the treatment of each of said tools, a cam, and connections between said cam and presenting means for turning the heel successively past each of said tools at varying speeds that each tool may act over the same extent of heel contour surface in successive equal units of time from one heel breast corner to the other.

9. In a machine for treating heels of boots and shoes, the combination of a tool, means for operating the tool, means for presenting the heel of a shoe to the action of the tool, a cam, a link connection between the cam and the presenting means, and means for periodically actuating the cam to cause rotation of the presenting means at varying speeds that equal portions of the heel contour may be treated by the tool in successive equal units of time.

10. In a machine for treating the heels of boots and shoes, the combination of a tool, means for rotating the tool, means for presenting the heel of a shoe to the action of the tool, a cam for rotating the presenting means, a cam for moving the presenting means towards and from the tool, and means for periodically actuating both of said cams to cause the tool to act upon equal contour portions of the heel in successive equal units of time.

11. In a machine of the character described, the combination of a tiltable tool for acting upon the heel of a shoe, means for operating the tool, means for presenting the heel of a shoe to the tool, means for traversing the heel past the tool at speeds to insure treatment of equal portions of the heel in successive equal units of time and a mounting for the tool so constructed and arranged that whatever tilting of the tool takes place will be about an axis which bears a fixed and unchanging relation to the mounting.

12. In a machine of the character described, in combination, a conveyor, a plurality of work supports mounted thereon, a plurality of operating instrumentalities adjacent the conveyor and spaced apart the same as the work supports on the conveyor, means intermittently to move the conveyor to present each work support successively to the said operating instrumentalities, and means to move the operating instrumentalities simultaneously to and from active position with respect to the work supports in timed relation to the movements of the conveyor.

13. In a machine of the character described, in combination, a turret having a plurality of shoe supports mounted thereon, a plurality of shoe-treating instrumentalities arranged around the turret and spaced to operate simultaneously on a plurality of shoes on the supports, a cam-controlled means simultaneously to move said instrumentalities toward and away from the supports.

14. In a machine for treating the heels of boots and shoes, the combination of a tiltable tool for acting on the contour surface of a heel, a mounting to constrain the tool to tilt in a predetermined vertical plane and about an axis in a horizontal plane predetermined by the mounting, and means for presenting a heel with its seat and tread surfaces substantially perpendicular to the plane of tilting and with one edge approximately at the predetermined axis.

15. In a machine for treating the heels of boots and shoes, the combination of a rotary tool for acting on the contour surface of a heel, a tiltable spindle carrying the tool, and a mounting for the spindle constructed and arranged to constrain it to tilt about an axis outside of itself.

16. In a machine for treating the heels of boots and shoes, the combination of a tiltable tool for acting on the contour surface of a heel, means for presenting the heel of a shoe for treatment by the tool, a top lift plate, a top lift plate follower, a guide for determining the inclination of the tool, and a mounting for the tool constructed and arranged to constrain it to tilt about a predetermined axis substantially at one edge of the guide, and said means being arranged to present the heel with one edge in approximate alinement with the predetermined axis.

17. In a machine for treating the heels of boots and shoes, the combination of a tiltable tool for acting on the contour surface of a heel, means for presenting the heel of a shoe for treatment by the tool, and means for supporting the tool for tilting about a predetermined axis, said heel presenting means being adjustable determinately to vary the relation between said axis and heels presented thereby.

18. In a machine of the character described, a turret, a plurality of work supports carried thereby, a plurality of operating instrumentalities arranged about the turret for operating simultaneously on a plurality of articles on the supports, means including a cam for moving said instrumentalities toward and from the turret, and mechanism to move the turret and the supports and the cam separately but in timed relation.

19. In a machine for use in making shoes, the combination of a tool for acting on a part of a shoe, a spindle about which the tool rotates, and a mounting for the spindle to permit it to tilt but constraining it to tilt only about an axis outside of itself and predetermined with respect to the mounting.

20. In a machine for treating parts of boots and shoes, the combination of a tool for acting on such parts, means for presenting them for treatment by the tool, means for supporting the tool and said presenting means for relative tilting movement, said supporting means being constructed and arranged positively to cause the tilting to take place about an axis in a predetermined horizontal plane outside of the axis of the tool, and being adjustable to vary the relation between the presenting means and the axis of tilting.

21. In a machine of the character described, the combination of a tool for acting upon the surface of a part of a shoe, means for presenting work for treatment by the tool and moving it relatively to the tool to present equal areas for treatment in equal successive units of time, and means for relatively tilting the presenting means and tool about a centre in a predetermined plane.

22. In a machine of the character described, in combination, a conveyor, a plurality of work supports thereon, a plurality of operating instrumentalities arranged to operate simultaneously on a plurality of articles on the supports, means to move the conveyor, means to move the work supports, movable means to separate and bring together the work supports and said instrumentalities, and mechanism to actuate the several means in timed relation.

23. In a machine of the character described, the combination of a tool, and a spindle for supporting the tool and arranged for tilting movement in a plane passing through the operative part of the tool and constructed to permit tilting only about an axis in a predetermined plane and outside of the spindle.

24. In a machine of the character described, the combination of a tool, means for rotating the tool, means for presenting work to the tool that it may act on the surface thereof, a spindle for supporting the tool and mounted for tilting movement in a plane passing through the centre of the tool and about an axis outside the spindle, and means for tilting the spindle about said axis.

25. In a machine of the character described, the combination of a tool, means for rotating the tool, means for presenting a heel to the tool that it may act on the surface of the heel between the top-lift and heel seat edges, means for supporting the tool for tilting movement in a plane passing through the centre of the tool and cutting the top-lift and heel seat edges and about a centre outside the centre of the tool, means for tilting the tool about said centre, and means for varying the tilting action of said means as the heel and tool are relatively moved.

26. In a heel treating machine, the combination of a tiltable tool, means for presenting a heel for treatment by the tool, means for relatively moving the heel and tool to cause the latter to treat the contour surface of the heel from one breast corner to the other, and a mounting for the tool so constructed and arranged that whatever tilting of the tool takes place will be about a point in a horizontal plane which is fixed with respect to the mounting as a centre as the heel and tool are so relatively moved.

27. In a heel treating machine, the combination of a tool, means for presenting a heel for treatment by the tool, means for relatively moving the heel and tool to cause the latter to treat the contour surface of the heel from one breast corner to the other, means acting yieldingly to tilt the tool about a point in the rand crease as a centre, and means for varying the action of said yielding means as the heel and tool are so relatively moved.

28. In a heel treating machine, the combination of a tiltable tool, means for presenting a heel for treatment by the tool, means for relatively moving the heel and tool to cause the latter to treat the contour surface of the heel from one breast corner to the other, a mounting for the tool constructed and arranged to constrain it to tilt about an axis in a plane fixed by the construction of the mounting, and a spring for tilting the tool.

29. In a heel treating machine, the combination of a tiltable tool, means for presenting a heel for treatment by the tool, means for relatively moving the heel and tool to cause the latter to treat the contour surface of the heel from one breast corner to the other, a spring for tilting the tool, and means for varying the tilting action of said spring during the operation of the machine.

30. In a heel treating machine, the combination of a tool, means for presenting a heel for treatment by the tool, means for relatively moving the heel and tool to cause the latter to treat the contour surface of the heel from one breast corner to the other, means for tilting the tool about a point in the rand crease as a centre, and manually controlled means for varying the action of the tilting means during the operation of the machine.

31. In a machine of the character described, the combination of a jack for supporting a shoe, a tiltable tool for acting upon a shoe supported thereby, means for relatively moving the jack and tool to cause the latter to treat the shoe, means for relatively moving the jack and tool towards and away from each other, and manually-operable means to control the tilting of the tool during the operation of the machine.

32. In a machine of the character described, the combination of a jack for supporting a shoe, a tiltable tool for acting upon the contour surface of a heel, means for relatively moving the jack and tool to cause the latter to treat the contour surface of the heel from one breast corner to the other, means for relatively moving the jack and tool towards and away from each other, and means for supporting the tool and constraining it to tilt in a vertical plane about an axis whose vertical position is fixed without regard to the position of the shoe.

33. In a machine of the character described, the combination with a tiltable rotary tool for acting on the contour surface of a heel, of means for supporting the tool for movement towards and from operative position and for constraining it to tilt about a centre outside the axis about which the tool is rotated.

34. In a machine of the character described, the combination of means for presenting a shoe for treatment, a tiltable tool for acting on a shoe, a support for the tool, means for moving the tool towards a shoe presented for treatment, and a mounting constructed to determine the vertical height of the axis about which the tool tilts, said shoe-presenting means being arranged to permit adjustment of the vertical position of the shoe with respect to the vertical position of the axis.

35. In a machine of the character described, the combination of means for presenting a shoe for treatment, a tool for acting on the heel of the shoe, a slide, and means mounted on the slide for supporting the tool, said supporting means serving as a pivot for tilting movement of the tool about a centre outside the axis of the tool.

36. In a machine of the character described, the combination of means for presenting a shoe for treatment, a tool for acting on the heel of a shoe, a slide, and link connections between the tool and slide to permit tilting movement of the tool about a centre outside the axis of the tool.

37. In a machine of the character described, the combination of means for presenting a shoe for treatment, a tool for acting on the outer periphery of the heel of the shoe, a slide, and connections between the tool and slide to cause movement of the tool with the slide and to constrain a tilting movement of the tool to movement about a centre outside the axis of the tool.

38. A turret machine comprising, in combination, a turret to present work successively to a series of tools, a plurality of tools arranged about the turret, mechanism to move the tools to and from operative position relatively to work presented by the turret, and means manually operable during the operation of the tools to vary their action on the work.

39. A machine of the class described comprising, in combination, a conveyor to present work successively to a series of operating instrumentalities, a plurality of such instrumentalities arranged to operate successively on work presented thereby, and an emergency lever to move said instrumentalities bodily and simultaneously away from the conveyor.

40. In a machine of the class described, the combination of means for presenting the heel of a shoe for treatment, a slide, a tool, and link connections between the tool and slide for causing the tool to move with the slide and relatively to the slide about a centre outside the axis of the tool.

41. In a machine of the class described, the combination of means for presenting the heel of a shoe for treatment, a tool shaft, a tool and rand guide on said shaft, a slide, link connections between the slide and tool shaft, and means for tilting the tool and tool shaft about a point on the edge of the rand guide as a centre.

42. In a machine for treating heels of boots and shoes, the combination of means for presenting the heel of a boot or shoe for treatment, a tool for acting on the surface of the heel between the top lift and heel seat edges from one breast corner to the other, means for supporting the tool for tilting movement to conform the tool to the varying inclinations of the heel surface, a counterbalance for the tilting movement of the tool, and means for tilting the tool.

43. In a machine for treating heels of boots and shoes, the combination of means for presenting the heel of a boot or shoe for treatment, a tool mounted for tilting movement, a counter-balance for the tilting movement of the tool, and means for tilting the tool to conform the inclination of the tool to the varying inclination of the heel from one breast corner to the other.

44. In a machine for treating heels of boots and shoes, the combination of means for presenting the heel of a boot or shoe for treatment, a tool mounted for tilting movement about the rand crease as a centre, a counterbalance for the tilting movement of the tool, means for tilting the tool about a point in the rand crease as a centre to conform the inclination of the tool to the varying inclination of the heel from one breast corner to the other, and means for varying the action of the tilting means.

45. A machine of the class described comprising, in combination, an instrumentality to operate in a cycle about the periphery of a piece of work, a spring to control the operation thereof, and means to vary the tension of the spring according to a definite corresponding cycle during the operation of said instrumentality to adjust it continuously to variations in different parts of the work.

46. A machine of the class described comprising, in combination, an instrumentality to operate in a cycle about the periphery of a piece of work, a spring to control the operation thereof, means to vary the tension of the spring according to a definite corresponding cycle during the operation of said instrumentality to adjust it continuously to variations in different parts of the work, and a manually-controlled device to vary the operation of said means.

47. A machine of the class described comprising, in combination, a conveyor for a plurality of shoes, a corresponding plurality of operating instrumentalities adjacent the conveyor to operate simultaneously on a plurality of shoes on the conveyor, and a series of interconnected levers to move said instrumentalities simultaneously to and from operative position relatively to shoes on the conveyor.

48. In a machine for treating the heels of boots and shoes, the combination of means for presenting the heel of a shoe for treatment, a tool shaft movable bodily towards and from the heel of a shoe presented thereto and supported to permit tilting only about a point outside the axis of the shaft, and a tool and rand guide mounted for movement longitudinally of the shaft by engagement of the rand guide and shoe vamp as the shoe and tool are moved into operative relation.

49. In a machine of the class described, the combination of a tool shaft, a tool rotatable with and freely movable longitudinally of said shaft, a rand guide movable longitudinally of the shaft with said tool, a slide, parallel link motion devices pivotally mounted on the slide and connected to the tool shaft above and below the tool and rand guide to effect tilting movement of the tool shaft about a centre in the edge of the rand guide.

50. In a machine of the class described, the combination of means for presenting the heel of a shoe for treatment, a tool for acting on the heel, means for supporting the tool for movement to and from and tilting movement with respect to a heel presented for treatment, a lock for holding the tool in retracted position, and means for tripping the lock and permitting the tool to move towards the heel when the machine is started.

51. In a machine for treating the heels of boots and shoes, the combination of a plurality of tools, means for operating the tools, a carrier having a series of shoe supports mounted thereon, power operating means for said carrier to move the shoe supports into and out of operating position with respect to said tools, means mounted in fixed position for jacking a shoe on any one of said shoe supports when moved into jacking relation with said jacking means, and means for rendering temporarily ineffective the power operating means for the carrier when one of the supports is in jacking position constructed and arranged again to render said power-operated means effective by the operation and release of the jacking means.

52. In a machine for treating the heels of boots and shoes, the combination of a table carrying a series of shoe supports, power operated means for moving the table, shoe jacking means mounted in fixed position for jacking shoes on said supports as they are successively presented to the jacking means by said table, a tool for treating the heel of a jacked shoe presented to it by the table, and means for suspending the operation of the power operated means for the table when a shoe support is in shoe jacking position until another shoe is jacked and then automatically acting to start the operation of the power operated means to move the jacked shoe from the jacking position to the tool for treatment.

53. In a machine for treating the heels of boots and shoes, a table carrying a plurality of shoe supports, jacking means and a heel treating tool, power operated means for moving the table to present a shoe support to the jacking means and a jacked shoe to the heel treating tool and stopping the table with the parts in said positions, and means controlled by the jacking means to start the table moving means into operation after a shoe has been jacked and the jacking means released.

54. In a machine for treating the heels of boots and shoes, a table carrying a plurality of shoe supports, jacking means and a heel treating tool, power operated means for moving the table to present a shoe support to the jacking means and a jacked shoe to the heel treating tool, means adjacent to the jacking means for stopping the table with the parts in said positions, and means automatically effective at the conclusion of a jacking operation to start the power means for moving the table.

55. In a machine for treating the heels of boots and shoes, a table carrying a plurality of shoe supports, jacking means and a heel treating tool, means for moving the table to present a shoe support to the jacking means and a jacked shoe to the heel treating tool and stopping the table with the parts in said positions, a jacking treadle, locking means for locking the jacking treadle until a shoe support is presented thereto, and means rendered effective through the jacking treadle to start the table moving means.

56. In a machine for treating the heels of boots and shoes, the combination of a carrier for a plurality of shoe supports, jacking means and a plurality of heel treating tools, means for moving the carrier to present a shoe support to the jacking means and a jacked shoe to one of said tools and stopping the carrier in said position, means controlled through the jacking means for again starting the carrier moving means, and means for locking the jacking means from operation until a shoe support is presented thereto.

57. In a machine of the character described, the combination of a table carrying a plurality of shoe supports, manually controlled jacking means and a heel treating tool, power means for moving the table to present a shoe support to the jacking means and a jacked shoe to the tool and stopping the table with the parts in said positions, and means for starting the power table moving means when the manually controlled jacking means is released after a jacking operation.

58. In a machine of the character described, the combination of a table carrying a plurality of shoe supports, a cutting or turning tool, a randing tool and a scouring tool mounted about the table, a jacking treadle, power means for turning the table to successively present a jacked shoe to the tools, and means for locking the jacking treadle until a shoe support on the table is presented to jacking position.

59. In a machine of the class described, the combination of a table carrying a plurality of shoe supports, shoe jacking means and a heel treating tool, means for moving the table to present a shoe support to the jacking means and a jacked shoe to the heel treating tool, means for turning the jacket shoe during treatment of the heel by the tool, and means for automatically unjacking the shoe and freeing it from the turning means as the shoe support approaches jacking position.

60. In a machine of the character described, the combination of a table carrying a plurality of shoe supports, shoe jacking means and a plurality of heel treating tools, means for moving the table to present the shoe supports successively to the jacking means and the jacked shoes successively to the heel treating tools, means for turning the jacked shoes as they are treated by the tools, and means for freeing the jacked shoes from the turning means and unjacking the shoes as they successively approach jacking position.

61. In a machine of the class described, the combination of a table carrying a plurality of shoe supports, shoe jacking means and a heel treating tool, means for moving the table to present a shoe support to the jacking means and a jacked shoe to the heel treating tool, means for turning the jacked shoe during treatment of the heel by the tool, means for automatically unjacking the shoe and freeing it from the turning means as the shoe support approaches jacking position, and means for tilting the shoe for convenient removal from the shoe support as it is unjacked.

62. In a machine of the class described, the combination of a table carrying a shoe support, means for swinging the shoe support to initial position when free for such movement, shoe jacking means, and a shoe treating tool, means for moving the table to present a shoe support to the jacking means and a jacked shoe to the shoe treating tool, means for turning the jacked shoe during treatment by the tool, and means for automatically unjacking the shoe and freeing it from the turning means as the shoe support approaches jacking position.

63. In a machine of the character described, the combination of a table carrying a shoe support, shoe jacking means, a shoe treating tool, means controlled through the jacking means for moving the table to present a jacked shoe to the tool and a shoe support to the jacking means, a lock for preventing actuation of the jacking means when a shoe support is not in jacking position, and means for automatically unjacking a shoe and unlocking the jacking means as a shoe support is moved into jacking position.

64. In a machine of the character described, the combination of a table carrying a series of shoe supports, a series of tools mounted about the table, means for moving the table to carry a shoe support into operative position relative to a tool, and means operable at will for stopping movement of the table, and connections between said tools and stopping means for moving the tools out of operative position when the machine is stopped.

65. In a machine of the character described, the combination of a table carrying a shoe support, a tool, means for moving the table to carry a shoe on said support into operative relation to the tool, means for turning the shoe support, and means operable at will for suspending the action of the table moving and shoe support turning means and simultaneously moving the tool from operative position.

66. In a machine of the character described, the combination of a table carrying a shoe support, a tool, means for moving the table to carry a shoe on said support into operative relation to the tool, means for turning the shoe support, and means operable at will for stopping the shoe support turning means and removing the tool from operative position.

67. In a machine of the character described, the combination of a table carrying a shoe support, a tool, means for moving the table to carry a shoe on said support into operative relation to the tool, means for turning the shoe support, and an emergency lever operable at will to move the tool back from operative position and simultaneously stop the table and shoe support turning means.

68. In a machine of the character described, the combination of a table carrying a plurality of shoe supports, a series of tools mounted at fixed positions about the table, means for moving the table to carry the shoe supports into operative relation to the tools, means for turning the shoe supports, means for continuously operating the tools, and means operable at will to stop the shoe support turning means and withdraw all the tools from operative position.

69. In a machine of the character described, the combination of a support, a jack mounted thereon, a tool, means for operating the tool, means for turning the jack to present different portions of the heel of a shoe for treatment by the tool, and means for removing the tool from its shoe treating position and for stopping the movement of the jack at will and at any stage of the operation independently of the movement of the tool.

70. In a machine of the character described, the combination of a table carrying a series of shoe supports, a series of tools mounted independently of the table, means for turning the shoe supports to present different portions of the heels of shoes to treatment by said tools, and means for removing the series of tools from shoe treating position and for stopping the shoe supports at will at any stage of the operation while the tools remain in action.

71. In a machine of the character described, the combination of a table carrying a series of shoe supports, a series of tools mounted independently of the table, means for turning the shoe supports to present different portions of the heels of shoes to treatment by said tools, means for stopping the shoe supports at will at any stage of the operation while the tools remain in action, and withdrawing the tools from operative position.

72. In a machine for treating boots and shoes along a varying contour, the combination of a tool, means for operating the tool at uniform speed, means for presenting the boot or shoe to treatment by the tool, and means for moving the presented shoe past the tool at angular speeds varying in inverse ratio to the distance of the part being treated from the centre about which the shoe is moved to cause the tool to act in each successive unit of time on an equal extent of the shoe.

73. In a machine for manufacturing shoes, the combination of a shoe support, a tool supported in a position for treating a shoe mounted on said support, and means for moving the shoe support at varying speeds past the tool to present to the tool equal portions of the shoe for treatment in successive equal units of time, and means for automatically tilting the tool to conform it to the inclination of the surface being treated.

74. In a machine of the character described, the combination of a table carrying a series of rotatable shoe supports, a series of tools arranged about the table for treating shoes presented to them by the shoe supports, a drive shaft, connections between the drive shaft and tools for operating the latter from the drive shaft, connections between the drive shaft and shoe supports for rotating the latter from the drive shaft including a clutch, and means for operating the clutch at will to interrupt the driving connections between the shoe supports and drive shaft while the driving connections between the drive shaft and tools remain in operation.

75. In a machine of the character described, the combination of a drive shaft, a movable table, a shoe support movably mounted thereon, a tool arranged adjacent to the table, connections between the tool and drive shaft, connections for operating the table and shoe support from the drive shaft, and means for interrupting the train of connections between the drive shaft and table and support to stop the movements of the table and shoe support while the tool remains in operative connection with the drive shaft.

76. In a machine of the character described, the combination of a drive shaft, a movable table, a shoe support movably mounted thereon, a tool arranged adjacent to the table, connections between the tool and drive shaft, connections for operating the table and shoe support from the drive shaft including members arranged to interrupt the driving connection between the drive shaft and table and support should undue resistance be encountered by the table or shoe support, and means for positively interrupting the said driving connection between the table and support with the drive shaft at will.

77. In a machine of the character described, the combination of a table carrying a series of jacks, tools arranged about the table, a drive shaft, connections between the drive shaft and table for rotating the latter to transfer work carried by the jacks into and out of operating position with respect to said tools, a jacking treadle for jacking a shoe on the table, means interposed in the connections between the drive shaft and table for interrupting the transmission of motion to the table through said connections while a shoe is being jacked, and means connected to the jacking treadle for automatically reestablishing said connections when the jacking treadle is released.

78. In a machine of the character described, the combination of a table, a series of shoe supports carried thereby, tools for acting on the heels of shoes mounted on said supports, a drive shaft, connections between the drive shaft and tools, connections between the drive shaft and table, a starting and stopping lever for controlling the drive shaft, and an emergency lever for interrupting the driving connections between the drive shaft and table while the drive shaft continues in operation.

79. In a machine of the character described, the combination of a drive shaft, a movable table, shoe supports movably mounted thereon, a series of tools mounted about the table, connections between the drive shaft and tools for operating the latter, connections between the drive shaft and table for operating the table, said connections including an upright shaft and a series of cams on said upright shaft for automatically controlling the operation of the table, the tools, and the shoe supports.

80. In a machine of the class described, the combination of an upright shaft, a table mounted on the shaft, a series of shoe supports mounted on the table, a series of tools arranged about the table for operation upon shoes carried by said shoe supports, a worm wheel on the upright shaft for rotating the shaft, a second worm wheel on the shaft for rotating the shoe supports, a third worm wheel on the shaft carrying cams for controlling the operative and inoperative condition of the first two worm wheels, and means for rotating the third worm wheel and its connected cams.

81. In a machine of the character described, the combination of a table carrying a series of shoe supports or jacks, a series of tools arranged about the table, a jack controlling cam having two cam grooves, one for moving the jacks relatively to the table toward and from the tools and the other for so controlling the rotative movement of the jacks that equal extents of heel surface may be treated by the tools in equal units of time, and means for operating the jack controlling cam.

82. In a machine of the class described, the combination of a table, a shoe support or jack mounted on the table, a tool supported independently of the table, cam operated means for moving the shoe support or jack toward and from the tool and cam operated means for so rotating the shoe support or jack that equal extents of heel surface may be treated by the tool in equal units of time throughout the extent of the heel.

83. In a machine of the character described, the combination of a shoe support, a tool, a cam operated lever for moving the shoe support towards and from the tool, and a cam operated lever for turning the shoe support to present equal extents of heel contour surface to the tool in equal units of time.

84. In a machine of the character described, the combination of a table, a tool, a shoe support mounted for rotative movement on the table, means which is positively moved in one direction for rotating the shoe support during treatment of the heel by the tool and which is spring-impelled in the opposite direction for automatically turning the shoe support to its initial position, and means for freeing the shoe support operating means from the positive means for rotating it and releasing it to the action of the spring as the shoe support approaches a predetermined position.

85. In a machine of the character described, the combination of a table, a shoe support mounted on said table, a tool, means for rotating the table to present a shoe on the shoe support for treatment by the tool, means for rotating the shoe support during treatment by the tool, means for freeing the shoe support from its rotating means and turning the rotating means to an initial position when the shoe support is moved to jacking position, and means for turning the shoe support to place it in operative connection with its operating means as it is moved towards the tool for treatment.

86. In a machine of the character described, the combination of a tool for acting upon the heel of a shoe presented thereto, a shaft carrying said tool, a slide, parallel arms mounted pivotally on the slide, and means connecting said parallel arms to the tool shaft at points above and below the tool to cause tilting movement of the tool shaft to be effected about a centre outside the tool shaft.

87. In a machine of the character described, the combination of a tool for acting upon the heel of a shoe presented thereto, a shaft carrying said tool, a rand crease guide on said shaft adjacent to said tool, a slide, arms pivotally mounted on the slide in a plane passing through the edge of the rand crease guide, and means connecting the arms to the tool shaft above and below the tool to cause tilting movement of the tool shaft to be effected about a point on the edge of the rand crease guide as a centre.

88. A machine of the class described comprising, in combination, an operating instrumentality, means automatically to control said instrumentality and vary its operation according to a definite cycle and including a lever arm, and a manually-controlled device to vary the effective length of the lever arm and thereby proportionately to change the variations introduced by said means.

89. A machine of the class described comprising, in combination, a work-support, an operating instrumentality adjacent thereto, said support and said instrumentality being mounted for relative movement to adapt the position of the instrumentality to that of the work, a spring to control such movement, and means including a cam to vary the tension of the spring through a predetermined cycle during the operation of the machine.

90. In a machine of the character described, the combination of a movable table, a series of shoe supports movably mounted on the table, tools mounted about the table for treating the heels of shoes carried by the shoe supports, means for operating the table and the shoe supports, and means for automatically varying the pressure of the tools against the heel being treated as the heel and tool are relatively traversed during treatment.

91. In a machine of the character described, the combination of a movable table, a series of shoe supports movably mounted on the table, tools mounted about the table for treating the heels of shoes carried by the shoe supports, means for operating the table and the shoe supports, means for applying pressure between the heel being treated and the tool treating it, and means for varying the pressure between the heel and tool at different parts of the heel.

92. In a machine of the character described, the combination of a movable table, a series of shoe supports movably mounted on the table, tools mounted about the table for treating the heels of shoes carried by the shoe supports, means for operating the table and the shoe supports, means for applying a predetermined pressure on the rand crease adjacent to the breast of a heel, automatically reducing such pressure progressively towards the rear of the heel, and automatically increasing the pressure progressively from the rear of the heel to the other breast corner.

93. In a machine of the character described, the combination of a shaft, a tool thereon for treating the heel of a shoe, a rand crease guide on said shaft adjacent to the tool, a shoe support for presenting a shoe for treatment by the tool, means for applying a predetermined pressure between the rand crease guide and work at one breast corner of the heel and progressively reducing and then progressively restoring such pressure as the heel and tool are relatively traversed to present portions of the heel from one breast corner to the other to the tool for treatment.

94. In a machine of the character described, the combination of a tool for treating the heels of boots and shoes, a shoe support for presenting a shoe heel for treatment by the tool, yielding means acting automatically to apply a predetermined pressure of the tool against the work at one breast corner of the heel, automatic means for progressively reducing the pressure as the rear of the heel is approached by the tool and then progressively increasing said pressure to the predetermined amount as the other breast corner of the heel is approached.

95. In a machine of the character described, the combination of a tool for treating the heels of boots and shoes, a shoe support for presenting a shoe heel for treatment by the tool, yielding means acting automatically to apply a predetermined pressure of the tool against the work at one breast corner of the heel, automatic means for progressively reducing the pressure as the rear of the heel is approached by the tool and then progressively increasing said pressure to the predetermined amount as the other breast corner of the heel is approached, and means adjustable at will for varying the action of said yielding means.

96. In a machine of the character described, the combination of a table, a shoe support carried by the table, a series of tools arranged about the table, means for forcing the tools toward the heel of a shoe presented for treatment, means for predetermining the degree of force exerted by said means, and means for automatically varying the degree of force exerted by said means as the heel and a tool are relatively traversed from one breast corner of the heel to the other.

97. In a machine for operating on shoes, in combination, a clamp to hold a shoe, a tool to operate on a shoe held thereby, a member movable to actuate the clamp, and mechanism set in operation by reverse movement of the member to move the clamped shoe into position to be acted upon by the tool.

98. In a machine for operating on shoes, in combination, means for holding a shoe comprising external and internal clamping members, a constantly operating tool to operate on a shoe held thereby, and mechanism to move the clamped shoe into and out of co-operative relation to the tool and thereafter to release the shoe from the clamp allowing it to drop away from one of said members.

99. In a machine for operating on shoes, in combination, a clamp to hold a shoe, a tool to operate on a shoe held thereby, a member positively to actuate the clamp, and mechanism set in operation by movement of said member to move the clamped shoe into and out of co-operative relation to the tool and thereafter to release the shoe from the clamp.

100. In a machine for operating on shoes, in combination, a tool for operating on shoes, a movable conveyor sequentially to present shoes thereto, and an emergency lever to stop the motion of the conveyor and simultaneously to move the tool away from its operative position.

101. In a machine for treating boots and shoes, in combination, a carrier provided with a plurality of shoe supports, an operating instrumentality, power means for moving the carrier to bring one of the shoe supports into operative relation to said operating instrumentality and another support into position for the application of a shoe thereto, a starting treadle to control the application of power to move the carrier, and means for preventing the operation of the starting treadle to supply power to move the carrier until a shoe support has been brought into position for the application of a shoe thereto.

102. In a machine for treating boots and shoes, the combination of a carrier for a plurality of shoe supports, a plurality of stations one of which is arranged for the application and removal of the work, operating instrumentalities at the other stations, means for moving the carrier to present a shoe support to the first-named station and a jacked shoe to one of the operating instrumentalities and stopping the carrier in said position, a starting treadle controlling the application of power from said carrier-moving means to the carrier again to start the carrier-moving means, and means dependent upon the position of the carrier controlling the operation of said starting treadle.

103. In a machine for treating shoes, the combination of a table carrying a plurality of shoe supports, shoe jacking means and a constantly operating shoe treating tool, means for moving the table to present a shoe support to the jacking means and a jacked shoe to the shoe treating tool, means for turning the jacked shoe during treatment of the shoe by the tool, and means for automatically unjacking the shoe as the shoe support approaches jacking position.

104. In a machine for treating shoes, the combination of a table carrying a plurality of shoe supports, shoe jacking means and a plurality of shoe treating tools, means for moving the table to present the shoe supports successively to the jacking means and the jacked shoes successively to the shoe treating tools, means for turning the jacked shoes as they are treated by the tools, and means for unjacking the shoes as they successively approach jacking position.

105. In a machine for treating shoes, the combination of a table carrying a plurality of shoe supports, shoe jacking means and a shoe treating tool, means for moving the table to present a shoe support to the jacking means and a jacked shoe to the shoe treating tool, means for turning the jacked shoe during treatment of the shoe by the tool, means for automatically unjacking the shoe as the shoe support approaches jacking position, and means for tilting the shoe for convenient removal from the shoe support as it is unjacked.

106. In a machine for treating shoes, the combination of a table carrying a shoe support, means for swinging the shoe support to initial position when free for such movement, shoe jacking means, and a shoe treating tool, means for moving the table to present a shoe support to the jacking means and a jacked shoe to the shoe treating tool, means for turning the jacked shoe during treatment by the tool, and means for automatically unjacking the shoe as the shoe support approaches jacking position.

In testimony whereof I have signed my name to this specification.

ALFRED B. FOWLER.